United States Patent
Ding et al.

(10) Patent No.: US 9,232,398 B2
(45) Date of Patent: Jan. 5, 2016

(54) METHOD AND APPARATUS FOR LINK SETUP

(71) Applicant: Huawei Device Co., LTD, Shenzhen (CN)

(72) Inventors: Zhiming Ding, Shenzhen (CN); Xinghua Li, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 19 days.

(21) Appl. No.: 14/155,762

(22) Filed: Jan. 15, 2014

(65) Prior Publication Data

US 2014/0136844 A1    May 15, 2014

Related U.S. Application Data

(63) Continuation of application No. PCT/CN2012/078698, filed on Jul. 16, 2012.

(30) Foreign Application Priority Data

Jul. 15, 2011   (CN) .......................... 2011 1 0199155

(51) Int. Cl.
*H04W 12/06* (2009.01)
*H04L 29/06* (2006.01)
*H04L 9/32* (2006.01)
*H04W 12/04* (2009.01)

(52) U.S. Cl.
CPC .................. *H04W 12/06* (2013.01); *H04L 9/32* (2013.01); *H04L 9/3273* (2013.01); *H04L 63/04* (2013.01); *H04L 63/06* (2013.01); *H04L 63/123* (2013.01); *H04W 12/04* (2013.01); *Y02B 60/50* (2013.01)

(58) Field of Classification Search
CPC ......... H04L 63/04; H04L 63/06; H04L 63/12; H04L 9/32; H04L 2463/082
USPC .............................. 380/247–30; 713/168–186; 370/310–350, 464–545
See application file for complete search history.

(56) References Cited

U.S. PATENT DOCUMENTS

| 7,890,745 B2 * | 2/2011 | Qi et al. .......................... 713/150 |
| 2002/0075805 A1 * | 6/2002 | Gupta et al. .................. 370/235 |

(Continued)

FOREIGN PATENT DOCUMENTS

| CN | 101166092 A | 4/2008 |
| CN | 101420694 A | 4/2009 |

(Continued)

OTHER PUBLICATIONS

De Rango, Floriano, Dionigi Cristian Lentini, and Salvatore Marano. "Static and dynamic 4-way handshake solutions to avoid denial of service attack in Wi-Fi protected access and IEEE 802.11 i." EURASIP Journal on Wireless Communications and Networking 2006.2 (2006): 73-73.*

(Continued)

*Primary Examiner* — Madhuri Herzog
(74) *Attorney, Agent, or Firm* — Slater & Matsil, L.L.P.

(57) ABSTRACT

A method for link setup includes sending a first authentication message including a user identifier to an access point (AP). A second authentication message sent by the AP according to the user identifier is received and includes an EAP method request message and a ANonce of the AP. A first PTK is generated according to the ANonce, an SNonce, and a first MSK. A third authentication message is sent to the AP. The third authentication message includes an EAP method response message, the SNonce, and a first MIC that is generated according to the first PTK. A fourth authentication message is sent by the AP when it authenticates, according to a second PTK, that the first MIC is correct. The fourth authentication message includes an EAP-Success message, configuration information configured by the AP for the terminal, and a second MIC. The second MIC is authenticated according to the first PTK.

32 Claims, 14 Drawing Sheets

(56) References Cited

U.S. PATENT DOCUMENTS

| | | | |
|---|---|---|---|
| 2004/0264435 A1* | 12/2004 | Chari et al. | 370/351 |
| 2007/0197190 A1* | 8/2007 | Tang | 455/410 |
| 2007/0280481 A1* | 12/2007 | Eastlake et al. | 380/277 |
| 2008/0002653 A1* | 1/2008 | Hung et al. | 370/338 |
| 2008/0065884 A1* | 3/2008 | Emeott | H04L 9/0836 713/168 |
| 2008/0098466 A1 | 4/2008 | Yoshida et al. | |
| 2010/0211790 A1* | 8/2010 | Zhang | 713/171 |
| 2010/0257361 A1* | 10/2010 | Tie | H04L 63/06 713/168 |
| 2010/0275086 A1 | 10/2010 | Bergquist et al. | |
| 2011/0055558 A1* | 3/2011 | Liu et al. | 713/160 |
| 2011/0154039 A1* | 6/2011 | Liu et al. | 713/170 |

FOREIGN PATENT DOCUMENTS

| | | |
|---|---|---|
| CN | 101771540 A | 7/2010 |
| CN | 101945372 A | 1/2011 |
| WO | 2006044251 A2 | 4/2006 |

OTHER PUBLICATIONS

Chen, Jyh-Cheng, Ming-Chia Jiang, and Yi-wen Liu. "Wireless LAN security and IEEE 802.11 i." Wireless Communications, IEEE 12.1 (2005): 27-36.*

Cisco Secure Services Client Administrator Guide, Release 5.1.1—Chapter 1: Network Security by Cisco Systems, 2008.*

Kassab, Mohamed, et al. "Fast pre-authentication based on proactive key distribution for 802.11 infrastructure networks." Proceedings of the 1st ACM workshop on Wireless multimedia networking and performance modeling. ACM, 2005.*

Emmelmann, et al., "Fast Initial Link Set-Up PARA and 5C," IEEE P802.11, Wireless LANs, Sep. 2010, 10 pages.

IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Computer Society, IEEE Std 802.11, Jun. 12, 2007, 1232 pages.

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 6: Medium Access Control (MAC) Security Enhancements, IEEE Computer Society, IEEE Std 802.11i, Jul. 23, 2004, 190 pages.

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 2: Fast Basic Service Set (BSS) Transition, IEEE Computer Society, IEEE Std 802.11r, Jul. 15, 2008, 126 pages.

* cited by examiner

METHOD AND APPARATUS FOR LINK SETUP

This application is a continuation of International Application No. PCT/CN2012/078698, filed Jul. 16, 2012, which claims priority to Chinese Patent Application No. 201110199155.9, filed with the Chinese Patent Office on Jul. 15, 2011, both of which are incorporated herein by reference in their entireties.

TECHNICAL FIELD

The present disclosure relates to the field of communications and, in particular embodiments, to a method and an apparatus for link setup.

BACKGROUND

During securely connecting to a wireless fidelity (WiFi) access point (AP), a WiFi terminal which is also referenced as a station (STA) needs to complete stipulated procedures such as scanning, open authentication, association, 802.1x authentication (that is, Extensible Authentication Protocol (EAP) authentication), and four-way handshake according to the 802.11 protocol of wireless local area network standards. In addition, it needs to complete an Internet Protocol (IP) address allocation process.

Specifically and generally, the STA may send a probe request frame to the AP, and detects the AP and queries attributes and capabilities of the AP according to a probe response returned by the AP. Before this, the STA may also intercept a beacon frame of the AP, and acquires the attributes and capabilities of the AP from the beacon frame. If the STA decides to connect to the AP, the STA sends an open system authentication request frame, that is, an authentication frame defined in the 802.11, to the AP, and specifies in the authentication frame that open system authentication is used, so as to be compatible with the 802.11 protocol of another version. After receiving the open system authentication request frame, the AP may return an open system authentication response frame, indicating that the STA is accepted.

After the open system authentication, the STA sends an association request frame to the AP, and the AP returns an association response frame, where the response frame carries an association identifier (AID) allocated by the AP to the STA. On a WiFi network, each STA on the network has a unique AID. Then, the STA and the AP perform an EAP authentication procedure. The EAP authentication is triggered by an Extensible Authentication Protocol over Local Area Network (EAPoL) start message that is sent by the STA to the AP. After receiving the EAPoL start message, the AP sends an EAP request/identity message to the STA to request a user identifier from the STA. The STA sends the user identifier to the AP by sending an EAP response/identity message to the AP. The subsequent process is an EAP method procedure. There are multiple EAP methods, the number of steps varies, and there are at least two air interface messages.

Generally, an authentication server (AS) participates the EAP authentication procedure. Essentially, the STA performs authentication to the AS. The AP may include an authenticator module, configured to forward a message in the EAP authentication procedure. After the EAP authentication is successful, the AS may notify the AP that the authentication is successful, and send a key called a pairwise master key (PMK) to the AP. The AP may further send an EAP-Success message to the STA to end the EAP authentication procedure. In the 802.11 specification, most functions of the AS are realized in the AP. However, in practical network deployment, the AP and the AS are generally separated from each other.

After the EAP authentication is completed, the AP acquires the PMK from the AS, and the STA is capable of obtaining a PMK through calculation. Then, based on the PMKs, the STA and the AP perform a four-way handshake procedure to negotiate a pairwise transient key (PTK). The PTK is practically used to protect air interface communication between the STA and the AP. The four-way handshake includes four messages. The first message is sent by the AP, and in the third message, the AP sends a group transient key (GTK) of the WiFi network to the STA after encrypting it by using the PTK. Therefore, the four-way handshake procedure further undertakes the function of transferring the GTK. In addition, in the four-way handshake procedure, both the STA and the AP sends a respective nonce to each other for calculating a PTK.

After the four-way handshake is performed successfully, the STA generally acquires an IP address according to the Dynamic Host Configuration Protocol (DHCP). The procedure may include four messages. The STA sends a DHCP Discovery message through broadcast; a DHCP server on the network side receives the DHCP Discovery message and returns a DHCP Offer message to the STA, where the DHCP Offer message includes an IP address allocated by the DHCP server to the STA. The STA sends a DHCP Request message through broadcast, where the DHCP Request message includes the identifier of a DHCP server selected by the STA and the IP address allocated by the DHCP server. Then, the selected DHCP server returns a DHCP ACK message to the STA to confirm that the IP address has been allocated. After receiving the DHCP Request message, an unselected DHCP server reclaims the IP address just allocated to the STA. For an IP network, the STA sets up a communication link to the WiFi network where the AP is located only when the STA acquires the IP address.

SUMMARY OF THE INVENTION

In one aspect, an embodiment of the present invention provides a method for link setup. A first authentication message is sent to an access point (AP). The first authentication message includes a user identifier. A second authentication message that is sent according to the user identifier by the AP is received. The second authentication message includes an Extensible Authentication Protocol (EAP) method request message and an ANonce of the AP. A first pairwise transient key (PTK) is generated according to the ANonce, a SNonce of a terminal, and an acquired first main session key (MSK). A third authentication message is sent to the AP. The third authentication message includes an EAP method response message, the SNonce, and a first message integrity code MIC. The first MIC is generated by the terminal according to the first PTK for protecting the third authentication message. A fourth authentication message is received. This message was sent by the AP when the AP authenticates, according to a second PTK, that the first MIC is correct. The fourth authentication message includes an EAP-Success message, configuration information configured by the AP for the terminal, and a second MIC, the second MIC is generated by the AP according to the second PTK for protecting the fourth authentication message, and the second PTK is generated by the AP according to the ANonce, the SNonce, and an acquired second pairwise master key PMK. The second MIC is authenticated according to the first PTK.

In another aspect, an embodiment of the present invention provides a method for link setup, which includes: receiving a first authentication message sent by a terminal, where the first authentication message includes a user identifier; sending a second authentication message to the terminal according to the user identifier, where the second authentication message includes an EAP method request message and a ANonce of an AP; receiving a third authentication message sent by the terminal, where the third authentication message includes an EAP method response message, a SNonce of the terminal, and a first MIC, the first MIC is generated by the terminal according to a first PTK for protecting the third authentication message, and the first PTK is generated by the terminal according to the ANonce, the SNonce, and an acquired first MSK; generating a second PTK according to the ANonce, the SNonce, and an acquired second PMK; sending a fourth authentication message to the terminal when authenticating, according to the second PTK, that the first MIC is correct, where the fourth authentication message includes an EAP-Success message, configuration information configured by the AP for the terminal, and a second MIC, and the second MIC is generated by the AP according to the second PTK for protecting the fourth authentication message, so that the terminal authenticates the second MIC according to the first PTK.

In still another aspect, an embodiment of the present invention provides a method for link setup, including: sending a first authentication message to an access point AP, where the first authentication message includes a terminal identifier; receiving a second authentication message that is sent according to the terminal identifier by the AP, where the second authentication message includes a ANonce of the AP; generating a first pairwise transient key PTK according to the ANonce, a SNonce of a terminal, and a preset pre-shared key PSK; sending a third authentication message to the AP, where the third authentication message includes the SNonce and a first message integrity code MIC, and the first MIC is generated by the terminal according to the first PTK for protecting the third authentication message; receiving a fourth authentication message that is sent by the AP when it authenticates, according to a second PTK, that the first MIC is correct, where the fourth authentication message includes an association identifier AID allocated by the AP for the terminal, a group transient key GTK, and a second MIC, the second MIC is generated by the AP according to the second PTK for protecting the fourth authentication message, and the second PTK is generated by the AP according to the ANonce, the SNonce, and the PSK; and authenticating the second MIC according to the first PTK.

In still another aspect, an embodiment of the present invention provides a method for link setup, including: receiving a first authentication message sent by a terminal, where the first authentication message includes a terminal identifier; sending a second authentication message to the terminal according to the terminal identifier, where the second authentication message includes a ANonce of an AP; receiving a third authentication message sent by the terminal, where the third authentication message includes a SNonce of the terminal and a first MIC, the first MIC is generated by the terminal according to a first PTK for protecting the third authentication message, and the first PTK is generated by the terminal according to the ANonce, the SNonce, and a preset PSK; generating a second PTK according to the ANonce, the SNonce, and the PSK; sending a fourth authentication message to the terminal when authenticating, according to the second PTK, that the first MIC is correct, where the fourth authentication message includes an association identifier AID allocated by the AP for the terminal, a group transient key GTK, and a second MIC, and the second MIC is generated by the AP according to the second PTK for protecting the fourth authentication message, so that the terminal authenticates the second MIC according to the first PTK.

In still another aspect, an embodiment of the present invention provides a terminal, including: a first sending module, configured to send a first authentication message to an AP, where the first authentication message includes a user identifier; a first receiving module, configured to receive a second authentication message that is sent according to the user identifier by the AP, where the second authentication message includes an Extensible Authentication Protocol EAP method request message and a ANonce of the AP; a generating module, configured to generate a first pairwise transient key PTK according to the ANonce, a SNonce of the terminal, and an acquired first main session key MSK; a second sending module, configured to send a third authentication message to the AP, where the third authentication message includes an EAP method response message, the SNonce, and a first message integrity code MIC, and the first MIC is generated by the terminal according to the first PTK for protecting the third authentication message; a second receiving module, configured to receive a fourth authentication message that is sent by the AP when it authenticates, according to a second PTK, that the first MIC is correct, where the fourth authentication message includes an EAP-Success message, configuration information configured by the AP for the terminal, and a second MIC, the second MIC is generated by the AP according to the second PTK for protecting the fourth authentication message, and the second PTK is generated by the AP according to the ANonce, the SNonce, and an acquired second pairwise master key PMK; and an authenticating module, configured to authenticate the second MIC according to the first PTK.

In still another aspect, an embodiment of the present invention provides an access point AP, including: a first receiving module, configured to receive a first authentication message sent by a terminal, where the first authentication message includes a user identifier; a first sending module, configured to send a second authentication message to the terminal according to the user identifier, where the second authentication message includes an EAP method request message and a ANonce of the AP; a second receiving module, configured to receive a third authentication message sent by the terminal, where the third authentication message includes an EAP method response message, a SNonce of the terminal, and a first MIC, the first MIC is generated by the terminal according to a first PTK for protecting the third authentication message, and the first PTK is generated by the terminal according to the ANonce, the SNonce, and an acquired first MSK; a generating module, configured to generate a second PTK according to the ANonce, the SNonce, and an acquired second PMK; and a second sending module, configured to send a fourth authentication message to the terminal when authenticating, according to the second PTK, that the first MIC is correct, where the fourth authentication message includes an EAP-Success message, configuration information configured by the AP for the terminal, and a second MIC, and the second MIC is generated by the AP according to the second PTK for protecting the fourth authentication message, so that the terminal authenticates the second MIC according to the first PTK.

In still another aspect, an embodiment of the present invention provides a terminal, including: a first sending module, configured to send a first authentication message to an access point AP, where the first authentication message includes a terminal identifier; a first receiving module, configured to receive a second authentication message that is sent according to the terminal identifier by the AP, where the second authentication message includes a ANonce of the AP; a generating module, configured to generate a first pairwise transient key PTK according to the ANonce, a SNonce of the terminal, and a preset pre-shared key PSK; a second sending module, configured to send a third authentication message to the AP, where the third authentication message includes the SNonce and a first message integrity code MIC, and the first MIC is generated by the terminal according to the first PTK for protecting the third authentication message; a second receiving module, configured to receive a fourth authentication message that is sent by the AP when it authenticates, according to a second PTK, that the first MIC is correct, where the fourth authentication message includes an association identifier AID allocated by the AP for the terminal, a group transient key GTK, and a second MIC, the second MIC is generated by the AP according to the second PTK for protecting the fourth authentication message, and the second PTK is generated by the AP according to the ANonce, the SNonce, and the PSK; and an authenticating module, configured to authenticate the second MIC according to the first PTK.

In still another aspect, an embodiment of the present invention provides an access point AP, including: a first receiving module, configured to receive a first authentication message sent by a terminal, where the first authentication message includes a terminal identifier; a first sending module, configured to send a second authentication message to the terminal according to the terminal identifier, where the second authentication message includes a ANonce of the AP; a second receiving module, configured to receive a third authentication message sent by the terminal, where the third authentication message includes a SNonce of the terminal and a first MIC, the first MIC is generated by the terminal according to a first PTK for protecting the third authentication message, and the first PTK is generated by the terminal according to the ANonce, the SNonce, and a preset PSK; a generating module, configured to generate a second PTK according to the ANonce, the SNonce, and the PSK; and a second sending module, configured to send a fourth authentication message to the terminal when authenticating, according to the second PTK, that the first MIC is correct, where the fourth authentication message includes an association identifier AID allocated by the AP for the terminal, a group transient key GTK, and a second MIC, and the second MIC is generated by the AP according to the second PTK for protecting the fourth authentication message, so that the terminal authenticates the second MIC according to the first PTK.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from these accompanying drawings without creative efforts.

DETAILED DESCRIPTION OF ILLUSTRATIVE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
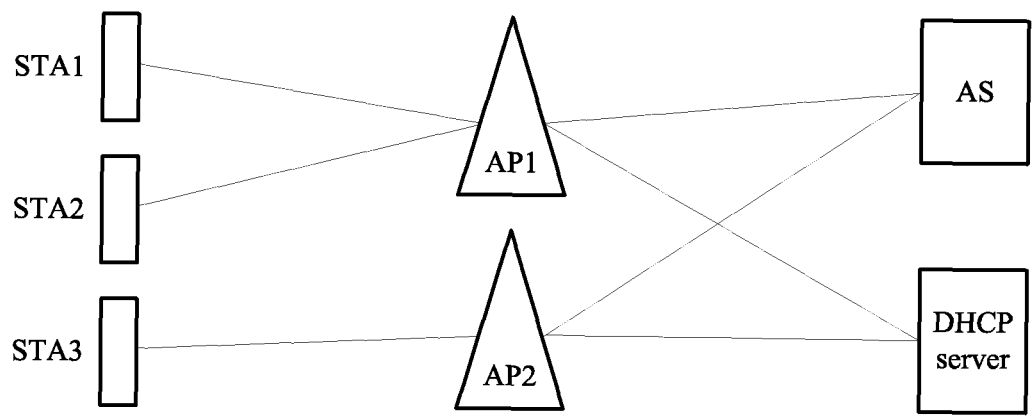
FIG. 1 is a schematic diagram of WiFi network architecture according to an embodiment of the present invention.

FIG. 1 is a schematic diagram of WiFi network architecture according to an embodiment of the present invention. As shown in FIG. 1, one AS may serve one or more APs, one DHCP server may serve one or more APs, multiple ASs may exist on a network, and multiple DHCP servers may exist on the network. In addition, one AP may serve one or more STAs, and an AP generally may include the authenticator function defined in 802.1x. In addition, the AP may further include the DHCP proxy function, and thereby the AP is capable of allocating an IP address for an STA. It should be understood that by setting up a communication link to the AP, the STA is capable of accessing the Internet through a routing device following the AP. It should further be understood that in the embodiment of the present invention, a WiFi terminal or a terminal refers to a terminal using the American Institute of Electrical and Electronics Engineers (IEEE) 802.11 air interface protocol, which is called STA for short.

Figure 2:
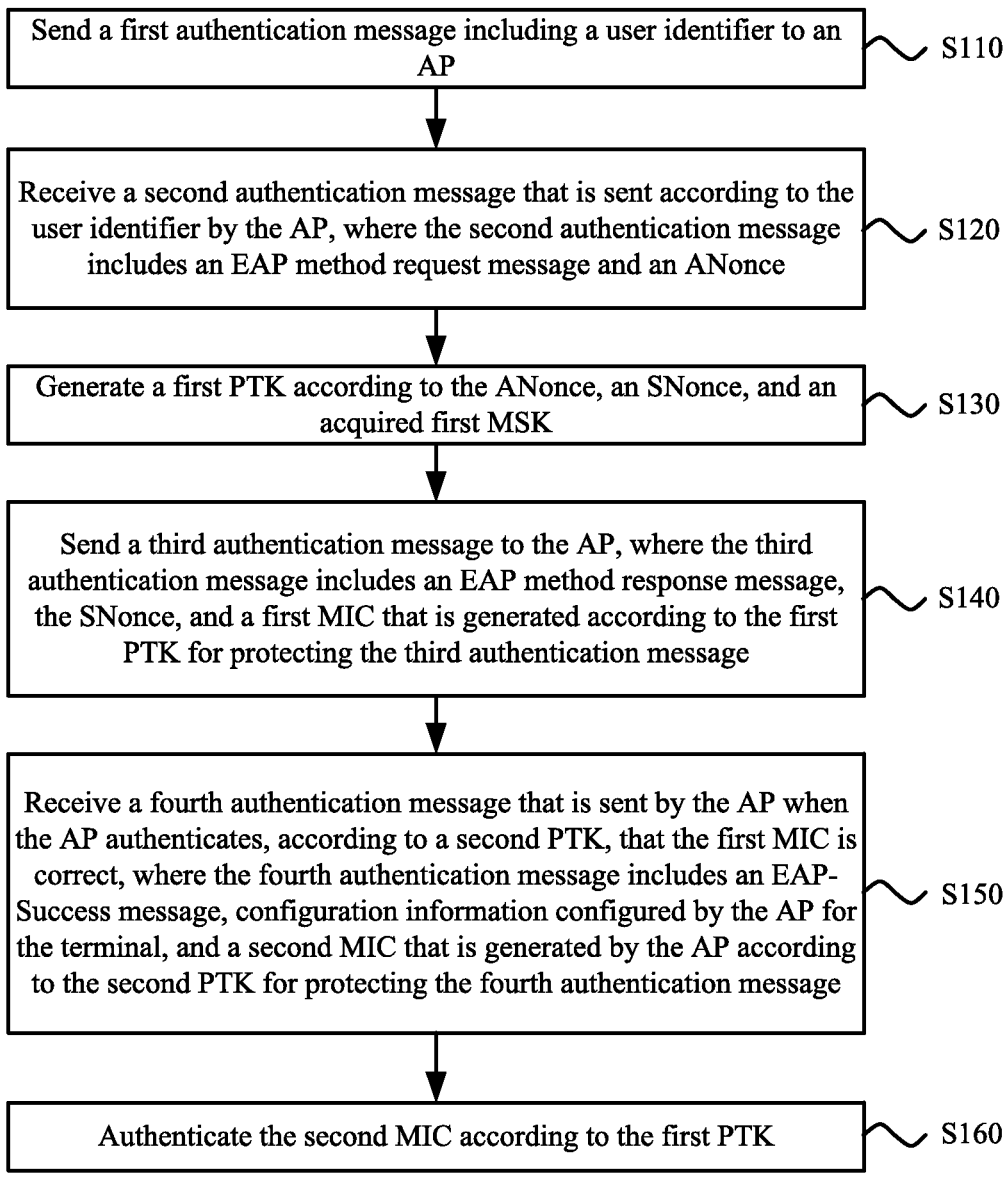
FIG. 2 is a schematic flow chart of a method for link setup according to an embodiment of the present invention.

FIG. 2 is a schematic flow chart of a method 100 for link setup according to an embodiment of the present invention. As shown in FIG. 2, the method 100 that can be performed by a terminal includes.

S110. Send a first authentication message to an AP, where the first authentication message includes a user identifier (User ID).

S120. Receive a second authentication message that is sent according to the user identifier by the AP, where the second authentication message includes an EAP method request message and a ANonce of the AP.

S130. Generate a first pairwise transient key (PTK) according to the ANonce, a SNonce of a terminal, and an acquired first main session key (MSK).

S140. Send a third authentication message to the AP, where the third authentication message includes an EAP method response message, the SNonce, and a first message integrity code (MIC), and the first MIC is generated by the terminal according to the first PTK for protecting the third authentication message.

S150. Receive a fourth authentication message that is sent by the AP when it authenticates, according to a second PTK, that the first MIC is correct, where the fourth authentication message includes an EAP-Success message, configuration information configured by the AP for the terminal, and a second MIC, the second MIC is generated by the AP according to the second PTK for protecting the fourth authentication message, and the second PTK is generated by the AP according to the ANonce, the SNonce, and an acquired second pairwise master key (PMK).

It should be understood that, for a successful EAP authentication procedure, the terminal and the AP should acquire the same PMK, and acquire the same PTK based on this. That is, the first PMK should be the same as the second PMK, and the first PTK should be the same as the second PTK.

S160. Authenticate the second MIC according to the first PTK.

According to the method for link setup in the embodiment of the present invention, an EAP authentication procedure is completed from the first authentication message that is sent by the terminal to the AP and carries the user identifier to the fourth authentication message that is sent by the AP and received by the terminal and carries the EAP-Success message. Certainly, it should be understood that if the EAP authentication fails, the fourth authentication message may carry an EPA-Failure message. At the same time, the four-way handshake function may be implemented from the second authentication message that carries information such as the ANonce and serves as the first message in a four-way handshake procedure in a related technology to the fourth authentication message that serves as the third message in the four-way handshake. The related technology may include, for example, the American Institute of Electrical and Electronics Engineers (IEEE) 802.11 specification. In another aspect, an IP address allocation procedure may be completed at the same time by using the first authentication message to the fourth authentication message that carry corresponding DHCP messages, or by using the fourth authentication message that carries an IP address allocated by a network-side device to the terminal. At the same time, an association procedure function in the related technology is completed by using the fourth authentication message that carries the configuration information.

According to the method in the embodiment of the present invention, procedures such as open system authentication, four-way handshake, association, and IP address allocation in the related technical specification may be integrated with the EAP authentication procedure into a unified procedure. In this way, bidirectional authentication between an STA and an AS and that between the STA and an AP may be performed at the same time while the flexibility that different specific authentication methods can be adopted between the STA and the AS is not affected. In addition, security and functionality of a link setup procedure can be maintained while the number of air interface messages exchanged is reduced. In addition, the method according to the embodiment of the present invention does not change the key hierarchy in 802.11 and therefore features good compatibility.

It should be understood that, in the related technology such as the IEEE 802.11 specification, the first message in the four-way handshake procedure includes the ANonce of the AP; the second message includes the SNonce of the STA and a corresponding MIC, and the second message may further include information about an algorithm adopted for calculating a PTK; the third message includes information related to an encryption algorithm, a GTK, an initial sequence number related to the GTK, the ID of the GTK, and a corresponding MIC, and the third message may further include the ANonce; the fourth message is used to confirm the third message, and the fourth message includes a corresponding MIC.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

In S110, optionally, the first authentication message includes an EAP response identifier message, where the EAP response identifier message includes the user identifier. That is, the first authentication message may directly carry the user identifier, and may also indirectly carry the user identifier by including another message. It should be understood that the user identifier is used to identify the identity of a user using the terminal, and the user identifier may also be called an identity, or a user identity. As an example, the user identifier may be an account name registered by the user with an operator, or the account name and a password.

It should be understood that the first authentication message and subsequent other authentication messages may all include an Algorithm parameter or a parameter in a determined robust security network (RSN) element. A value of the Algorithm parameter may be:

(1) Open System: indicates that open system authentication is used. Actually, no actual authentication is performed in authentication message exchange, and the AP simply accepts the STA. According to the existing specification, if the STA and the AP both support the robust security network, the EAP authentication procedure may be performed in the subsequent process.

(2) Shared Key: indicates that the shared key authentication method defined in the 802.11 specification is used, that is, authentication between the STA and the AP is completed during authentication message exchange. This authentication method is no longer used in a system with a high security requirement. Instead, the EAP authentication procedure is performed in the subsequent process.

(3) Fast Transition: indicates that a STA that supports a mobile application switches from one AP to another AP, rather than setup of an initial link.

(4) Fast Initial Link Setup: indicates a network access procedure in the embodiment of the present invention is adopted.

The robust security network element (RSN element) is an information element including a set of a group of parameters.

For example, the RSN element may include information such as an encryption algorithm supported by the STA or the AP and an authentication mechanism supported by the STA or the AP. The authentication mechanism may be an authentication mechanism defined in 802.1x, i.e., an EAP mechanism, or the pre-shared key (PSK) mechanism. Actually, in the PSK mechanism, a preset key is directly used as a PMK, whereas in the EAP authentication mechanism, an MSK is generated after the EAP authentication is successful, and a PMK is obtained according to the MSK. In the embodiment of the present invention, the EAP mechanism and the PSK mechanism are supported. In the existing specification, whether to use the EAP mechanism or the PSK mechanism is negotiated by using the RSN element in an association procedure. An authentication frame does not always include the RSN element. For the embodiment of the present invention, if the Algorithm indication in the first authentication message is "Fast Initial Link Setup", the first authentication message needs to include the RSN element to specify whether the STA supports the EAP and/or the PSK. The RSN element may clearly specify that only one of the authentication mechanisms is supported, or both authentication mechanisms are supported and the AP decides which authentication mechanism is used.

In S120, the second authentication message may further include other information related to the first message in the four-way handshake procedure in the related technology. The related technology may include, for example, the IEEE 802.11 specification. It should be understood that an EAP method is a process starting from the second EAP-Request message in the EAP authentication procedure. Specifically, EAP is an extensible authentication protocol, and it uses a fixed data encapsulation form to encapsulate various authentication methods in it. According to the EAP protocol, it is always that an authenticator sends an EAP-Request message to a supplicant, and the supplicant returns an EAP-Response message. The request-response procedure may be performed several times. Finally, the authenticator sends an EAP-Success or EAP-Failure message to the supplicant to end the EAP procedure. The authenticator is located on the network. For example, the authenticator is located on the AP. The supplicant refers to a party that requests access to the network, and is generally a terminal, for example, an STA.

The first pair of request-response messages in the EAP protocol is used for the supplicant to send identity information to the authenticator, where the identity information is generally the user identifier. Specifically, the authenticator sends an EAP-Request/ID message to the supplicant, where the message is an EAP-Request message and a parameter in it is used to indicate that the message is used to request the identity; and then the supplicant sends an EAP-Response/ID message to the authenticator, where a parameter in the message is used to indicate that the message is a response message of the identity, and the message carries the identity. In specific network deployment, an authentication procedure generally involves three parties, that is, the supplicant, the authenticator, and the authentication server. The actual authentication occurs between the supplicant and the authentication server, and the authenticator forwards the identity to the authentication server after acquiring the identity from the supplicant, so as to trigger a subsequent EAP method procedure. The authenticator plays only a role of forwarding. The EAP-Request/ID message and the EAP-Response/ID message belong to the EAP procedure or the EAP authentication procedure, but do not belong to the EAP method procedure. The EAP method procedure starts from the second EAP-Request message, and a field in the message may be used to indicate a specific authentication method, for example, EAP-Authentication and Key Agreement (AKA), EAP-Transport Layer Security (TLS), or another method.

In S130, the terminal may calculate an MSK and further obtain a PMK through calculation. Then, the terminal is capable of obtaining a PTK through calculation according to the PMK, the ANonce, the SNonce, and media access control (MAC) addresses of the AP and the STA. For example, the terminal may calculate the MSK according to a key and exchanged information in the EAP procedure, where the information includes, for example, field information, a random number, and a count.

It should be understood that after a successful EAP procedure, MSKs obtained through calculation by the terminal and the AP should be the same, and the specific time when an MSK is generated is not stipulated in the EAP protocol. For example, in the EAP-AKA authentication method, an MSK can be obtained through calculation after the authentication server sends a first message, that is, the second EAP-Request message sent by the authenticator in the EAP procedure or the first request message sent by the authenticator in the EAP method. After receiving the first request message in the EAP method, the supplicant is capable of obtaining an MSK through calculation. The MSK calculation is based on a pre-shared key about the user identifier, a random number generated by the AS, and the like, where the pre-shared key is preset by both the supplicant and the authentication server. For the EAP-TLS method, the supplicant may send implicit data (that is, a random number) to the authentication server. The implicit data is encrypted by using a transient key negotiated in the EAP authentication procedure and then sent to the authentication server. Then, the two parties calculate MSKs based on the implicit data and respective random numbers (transmitted in plaintext) exchanged in the EAP procedure.

In S140, the third authentication message may further include other information related to the second message in the four-way handshake procedure in the related technology. For example, the third authentication message may further include information about an algorithm adopted for calculating a PTK, and the like.

In S150, the configuration information includes an association identifier AID and/or a group transient key GTK. The fourth authentication message may further include other information related to the third message in the four-way handshake procedure in the related technology. For example, the fourth authentication message may further include an initial sequence number related to the GTK, the ID of the GTK, and the like.

In S160, the terminal authenticates the second MIC according to the first PTK. If the authentication is successful, the terminal may acquire information such as the AID and the GTK from the fourth authentication message, and may continue the subsequent process. Otherwise, the terminal sends an authentication failure message or makes no response to the AP.

In the embodiment of the present invention, optionally, when the terminal authenticates that the second MIC is correct, the method 100 further includes: sending, by the terminal, a fifth authentication message to the AP, where the fifth authentication message includes a fourth MIC, and the fourth MIC is generated by the terminal according to the first PTK for protecting the fifth authentication message. The fifth authentication message may serve as the last message in the four-way handshake procedure in the related technology, and the fifth authentication message is used to confirm the fourth authentication message.

In the embodiment of the present invention, the IP address of the terminal may be allocated by a network-side device, for example, allocated by the AS, and may also be acquired by the AP according to the DHCP protocol. Therefore, optionally, the fourth authentication message further includes a first IP address allocated by the network-side device for the terminal. Optionally, the first authentication message further includes a Dynamic Host Configuration Protocol DHCP Discovery message; the second authentication message further includes a DHCP Offer message, where the DHCP Offer message includes the server identifier of a DHCP server sending the DHCP Offer message and a second IP address allocated by the DHCP server; the third authentication message further includes a DHCP Request message; and the fourth authentication message further includes a DHCP ACK message sent by a selected DHCP server.

Figure 3:
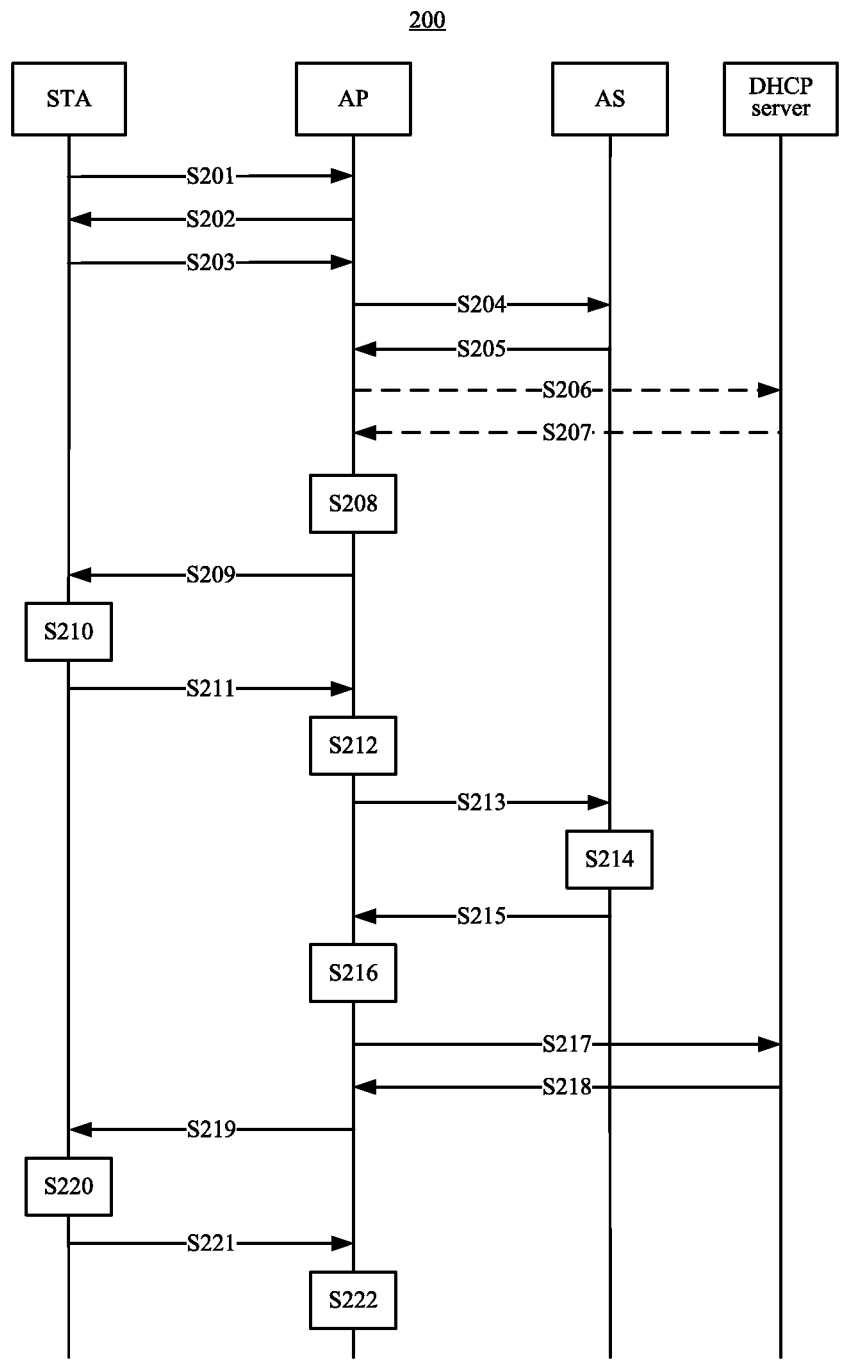
FIG. 3 is another schematic flow chart of a method for link setup according to an embodiment of the present invention.

The following describes an embodiment of the present invention in detail with reference to the flow chart shown in FIG. 3. As shown in FIG. 3, a method 200 for link setup according to the embodiment of the present invention includes:

S203. An STA sends a first authentication message to an AP. The first authentication message and subsequent air interface messages may all include an Algorithm and a parameter in a determined RSN element. This is not repeatedly described in the following. The first authentication message may include an EAP-Response/ID message, where the EAP-Response/ID message includes a user identifier User-ID. The EAP-Response/ID message may serve as a message that triggers an EAP authentication procedure. It should be understood that the first authentication message and subsequent authentication messages may be obtained by modifying an Authentication message in the existing specification. Optionally, the first authentication message includes a DHCP Discovery message.

S204. After receiving the first authentication message, the AP forwards the User-ID to an AS. According to a communication protocol between the AP and the AS, the AP and the AS may simply encapsulate an EAP message in a protocol packet between them for transfer. For example, in this step, the AP acquires the EAP-Response/ID message from the first authentication message, encapsulates the EAP-Response/ID message in an Access Request (ARQ) message, and sends it to the AS. The AP and the AS may also acquire information in an EAP message and re-encapsulate it in a packet between them for transfer. For example, in this step, the AP acquires the user identifier User-ID from the EAP-Response/ID message, encapsulates the User-ID in an ARQ message, and sends it to the AS. It should be understood that in the embodiment of the invention, messages sent by the AP to the AS are all called ARQ messages, meaning access requests. Messages sent by the AS to the AP are all called Access Accept (AAC) messages, meaning access approval.

S205. The AS receives the User-ID from the AP. If the User-ID exists, the AS sends the first message of an authentication procedure to the AP to start the authentication procedure. If it is stipulated on a network that the AS allocate an IP address to the STA, the message sent by the AS to the AP includes a preallocated IP address.

S208. After acquiring the IP address preallocated by the AS from the message in S205 or acquiring a preallocated IP address by using the DHCP protocol, the AP stores the IP address and sends it to the STA in a subsequent step.

S209. The AP sends a second authentication message to the STA, where the second authentication message includes a ANonce of the AP, an EAP-Request message, and other related information in the first message in a four-way handshake. The EAP-Request message is the first message in an EAP method procedure between the AP and the STA, and is the second EAP-Request message in the EAP procedure that the same time (the EAP-Request/ID and the EAP-Response/ID messages belong to the EAP procedure but do not belong to the EAP method procedure). The EAP-Request message may be an EAP-Request message that is encapsulated in the AAC message by the AS in S205 and directly forwarded, and may also be generated after the AP parses the AAC message. This is not repeatedly described in the following. It should be understood that information included in the EAP-Request message varies according to a used EAP method. In addition, after receiving the second authentication message, the STA may acquire and temporarily store the ANonce and other related information in the first message in the four-way handshake.

Optionally, the second authentication message includes a DHCP Offer message. The DHCP Offer message includes the identifier of a DHCP server allocating an IP address and the IP address allocated by the DHCP server. If it is stipulated on the network that the AS allocate the IP address, the AP uses the identifier of the AS as the identifier of the DHCP server. There may be multiple DHCP servers sending DHCP Offer messages to the AP. In this case, the AP needs to include only one DHCP Offer message in the second authentication message. Generally, a selected DHCP server is the sender of the first DHCP Offer message received by the AP.

S210. The STA may acquire a PMK according to the ANonce in the second authentication message, a SNonce, and an acquired first MSK, and obtain a first PTK through calculation according to the PMK, the ANonce, the SNonce, and MAC addresses of the AP and the STA. After any EAP method is performed successfully, both interaction parties, that is, the AS and the STA, each generates an MSK. Once the MSK is acquired, the PMK can be obtained, and thereby the PTK can be obtained through calculation. After obtaining the PTK through calculation, the STA uses the PTK to protect an air interface message sent to the AP, that is, includes an MIC in the air interface message.

S211. The STA sends a third authentication message to the AP, where the third authentication message includes the last EAP-Response message in the EAP method, a first MIC generated according to the first PTK for protecting the third authentication message, and other related information in the second message in the four-way handshake. Optionally, the third authentication message further includes a DHCP Request message.

S212. After receiving the third authentication message, the AP buffers content of the third authentication message and the first MIC. The AP has not acquired the PMK and cannot obtain the PTK through calculation. Therefore, authentication on the first MIC of the third authentication message is delayed.

S213. The AP sends an ARQ message to the AS, where the ARQ message bears information in the EAP-Response message in the third authentication message.

S214. If the EAP procedure is successful, the AS generates an MSK, and thereby acquires a PMK.

S215. The AS sends an authentication success message to the AP and includes the PMK in the message.

S216. After receiving the authentication success message sent by the AS, the AP acquires the PMK, obtains a second PTK through calculation according to information such as the SNonce acquired from the third authentication message, the ANonce of itself, and the MAC addresses of the STA and the AP, and authenticates the first MIC by using the second PTK.

S219. The AP sends a fourth authentication message to the STA, where the fourth authentication message includes an EAP-Success message, an association identifier AID allocated by the AP for the STA, a group key GTK, and information related to the GTK, and further includes other related information such as the ANonce in the third message in the four-way handshake and a second MIC, and the second MIC is generated by the AP according to the second PTK for protecting the fourth authentication message. Optionally, the fourth authentication message further includes a DHCP ACK message. The GTK and the information related to the GTK are encrypted by using the PTK. According to the embodiment of the present invention, the AID in the fourth authentication message may also be encrypted by using the PTK and then transmitted, thereby enhancing information security. The fourth authentication message may further include other information specified by the AP, for example, association expiration time and the maximum idle duration.

S220. The STA authenticates the second MIC according to the first PTK. If the STA successfully authenticates the second MIC, the STA acquires information such as the AID and the GTK from the fourth authentication message, and the method 200 may include S221 and S222. Otherwise, the STA sends an authentication failure message or makes no response to the AP.

S221. After successfully authenticating the second MIC of the fourth authentication message, the STA sends a fifth authentication message to the AP, where the fifth authentication message includes a fourth MIC, the fourth MIC is generated by the STA according to the first PTK for protecting the fifth authentication message, and the fifth authentication message may include the SNonce and other related information in the fourth message in the four-way handshake. The fifth authentication message is used to notify the AP that the fourth authentication message is received, and is the last message on an air interface in the whole network access procedure.

S222. After receiving the fifth authentication message, the AP may authenticate the fourth MIC of the fifth authentication message according to common practice, and if the authentication fails, may release the association with the STA, and notify the AS that the whole authentication procedure fails. The releasing the association is reclaiming the AID allocated to the STA, deleting STA-related authentication information such as the PTK, and refusing to receive or making no response to a message subsequently sent by the STA.

It should be understood that, the sequence numbers of the above steps do not imply an execution sequence, and the execution sequence of the steps should be determined according to the functions and internal logic, which is not intended to limit the implementation process of the embodiments of the present invention in any way.

Optionally, before S203, the method 200 includes:

S201. After detecting a required AP, the STA sends a sixth authentication message to the AP, where the sixth authentication message specifies that the method for link setup in the embodiment of the present invention is used and includes an EAP start message. The EAP start message is encapsulated in the sixth authentication message as an information element. It should be understood that in the existing specification, other information included in an Authentication frame may be included in the sixth authentication message so that the information is exchanged while the EAP procedure is started. The information includes, for example, a mobile domain identifier, a supported rate, a power supply capability, a quality of service (QoS) capability, and a coexistence feature.

S202. After receiving the sixth authentication message, the AP returns a seventh authentication message to the STA. The Algorithm value in the seventh authentication message is the same as that in the sixth authentication message. The AP determines, according to an RSN element in the sixth authentication message, to use one of authentication methods supported by the STA, and specifies the authentication method in an RSN element in the seventh authentication message. The RSN element in the seventh authentication message may further include other information such as an encryption algorithm finally determined by the AP.

Certainly, the STA may specify an authentication method in the RSN element of the sixth authentication message. In this case, the AP cannot further perform selection, and can only determine whether the AP supports the authentication method. If the AP does not support the authentication method specified by the STA, the AP specifies a failure in a status field of the seventh authentication message. If the STA specifies in the sixth authentication message that the EAP authentication mechanism is used, and the sixth authentication message includes an EAP start message, the AP includes an EAP-Request/ID message in the seventh authentication message. Certainly, it may also be stipulated that the STA specify in the sixth authentication message that EAP is used, but the EAP start message does not need to be included because the EAP start message is supplemented in 802.1x and a standard EAP protocol does not include the message. After receiving the sixth authentication message, if the AP detects that the STA wants to use the EAP method, the AP enables the seventh authentication message to carry the EAP-Request/ID message. The seventh authentication message may further include capability and attribute information in Authentication and Association frames in the existing specification.

If S201 and S202 are skipped, the information included in the sixth authentication message may be included in the first authentication message, and the information included in the seventh authentication message may be included in the second authentication message. That is, functions implemented by the sixth authentication message and the seventh authentication message are completed by the first authentication message and the second authentication message, so that fewer messages are used in the initial link setup procedure, thereby saving more required time.

In the embodiment of the present invention, if the IP address of the terminal is allocated by a network-side device, the first message of the authentication procedure sent by the AS and received by the AP in S205 includes an IP address preallocated by the network-side device. In S208, the AP stores the IP address, and in S219, the fourth authentication message sent by the AP to the STA includes the IP address preallocated by the network-side device to the STA.

In the embodiment of the present invention, if the AP acquires, according to the DHCP protocol, the IP address allocated to the STA, the method 200 further includes:

S206. If the AS does not preallocate an IP address for the STA in S205, a DHCP proxy module of the AP forwards the DHCP Discovery message included in the first authentication message or generates a new DHCP Discovery message and sends it. The DHCP Discovery message is a broadcast message at the IP layer. Multiple DHCP servers may exist on the network side, and the multiple DHCP servers may all receive the DHCP Discovery message.

S207. A DHCP server receiving the DHCP Discovery message sends a DHCP Offer message to the AP, where the DHCP Offer message carries the provided IP address and the identifier of the server itself, and the identifier is generally the IP address of the DHCP server itself.

S217. If the AP successfully authenticates the first MIC of the third authentication message, the AP forwards the DHCP Request message or generates a new DHCP Request message, where the DHCP Request message includes the identifier of a selected DHCP server and the IP address allocated by the DHCP server for the STA. If the AP fails to authenticate the first MIC of the third authentication message, it indicates that an abnormality occurs in the previous EAP procedure. In this case, an authentication failure is fed back to the AS, which is not described in detail herein.

S218. The selected DHCP server sends a DHCP ACK message to the AP to confirm that the IP address pre-allocated is allocated for the STA.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

In the embodiment of the present invention, the first authentication message may further include the SNonce, so that the AP is capable of obtaining the PTK through calculation earlier and thereby protecting the air interface message earlier. Specifically, the first authentication message further includes the SNonce; and the second authentication message further includes a third MIC, where the third MIC is generated by the AP according to the second PTK for protecting the second authentication message. The sending the third authentication message to the AP includes: sending the third authentication message to the AP when authenticating, according to the first PTK, that the third MIC is correct. The following describes this solution in detail with reference to FIG. 4.

Figure 4:
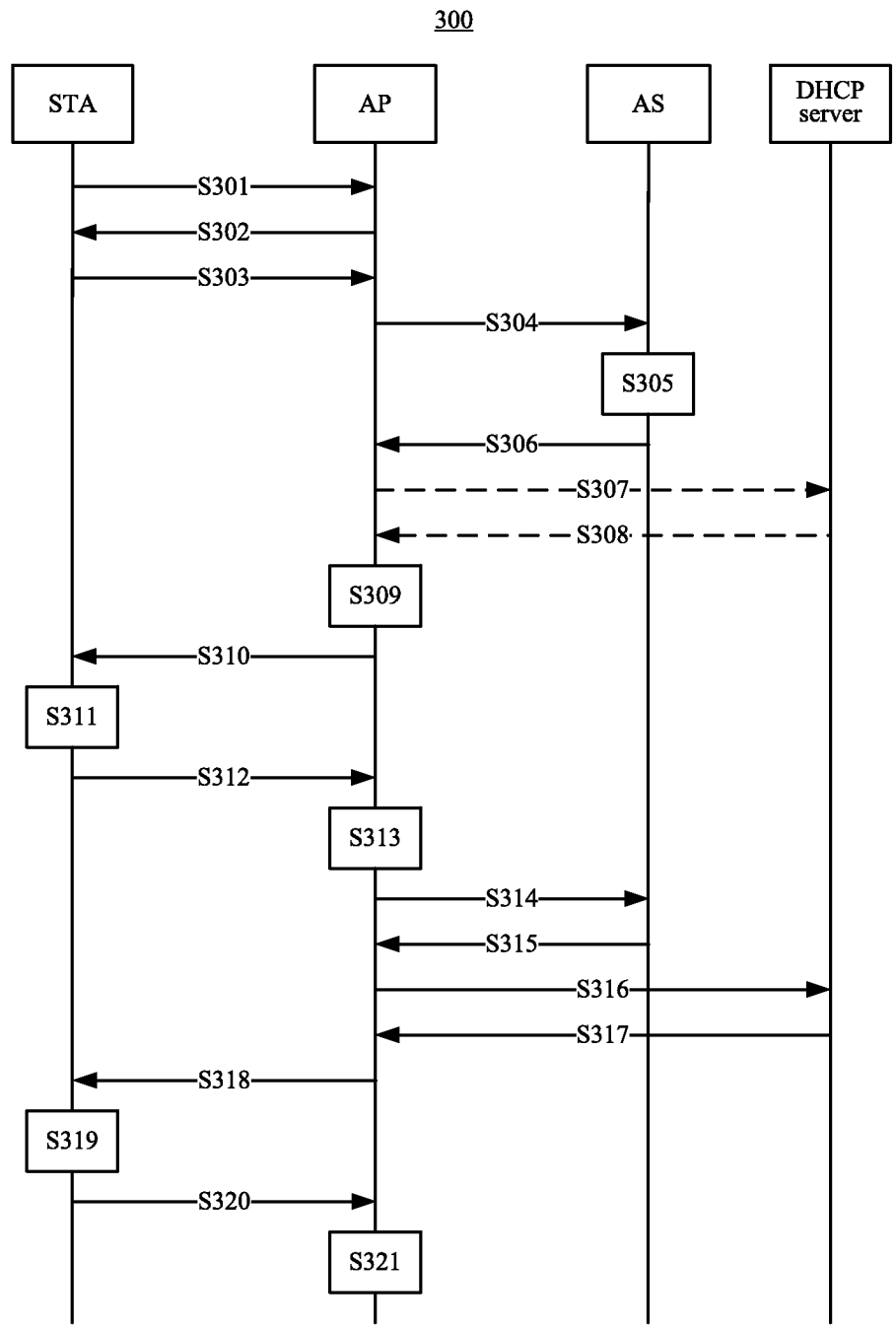
FIG. 4 is still another schematic flow chart of a method for link setup according to an embodiment of the present invention.

As shown in FIG. 4, S301 and S302 are the same as S201 and S202 in the method 200 in FIG. 3, respectively. Details are not described herein. An STA sends a first authentication message to an AP, where the first authentication message includes a user identifier and a SNonce of the STA (as shown in S303); the AP sends a first Access Request message to an AS, where the first Access Request message includes the user identifier and the SNonce (as shown in S304); the AS generates an MSK, and obtains a PMK through calculation according to information such as the SNonce (as shown in S305); and the AS sends a first Access Accept message to the AP, where the first Access Accept message includes the PMK (as shown in S306).

After receiving the PMK, the AP may obtain a second PTK through calculation according to the PMK, an ANonce, the SNonce, and MAC addresses of the AP and the STA, so that an authentication message subsequently sent to the STA can be protected (as shown in S309). Therefore, a second authentication message sent by the AP to the STA may further include a third MIC, where the third MIC is generated by the AP according to the second PTK for protecting the second authentication message (as shown in S310). After receiving the second authentication message, the STA needs to use the first PTK obtained through calculation to authenticate the third MIC (as shown in S311), and sends a third authentication message to the AP when the STA successfully authenticates the third MIC (as shown in S312). The AP has obtained the second PTK through calculation. Therefore, after receiving the third authentication message, the AP may immediately authenticate the first MIC (as shown in S313). In addition, an authentication success message sent by the AS to the AP does not need to include the PMK (as shown in S315).

It should be understood that S307, S308, S314, and S316 to S321 are the same as S206, S207, S213, and S217 to S222 in the method 200 illustrated in FIG. 3, respectively. Details are not described herein.

It should be understood that, the sequence numbers of the above steps do not imply an execution sequence, and the execution sequence of the steps should be determined according to the functions and internal logic, which is not intended to limit the implementation process of the embodiments of the present invention in any way.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

Figure 5:
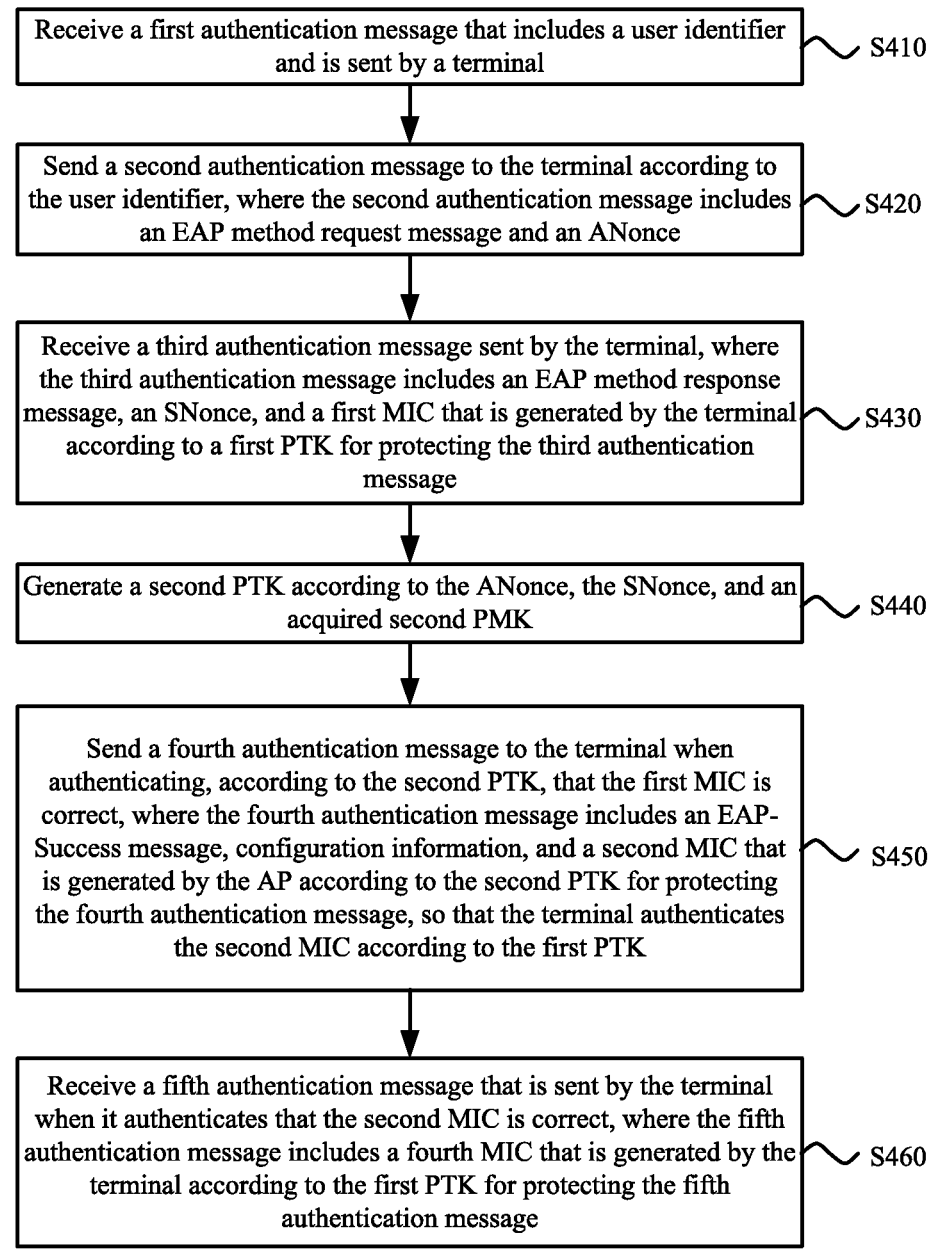
FIG. 5 is a schematic flow chart of a method for link setup according to another embodiment of the present invention.

With reference to FIG. 2 and FIG. 4, the foregoing describes in detail the method for link setup according to the embodiment of the present invention from the view of a terminal STA. With reference to FIG. 5, the following describes in detail a method according to an embodiment of the present invention from the view of an access point AP.

As shown in FIG. 5, a method 400 for link setup according to an embodiment of the present invention includes:

S410. An AP receives a first authentication message sent by a terminal, where the first authentication message includes a user identifier.

S420. The AP sends a second authentication message to the terminal according to the user identifier, where the second authentication message includes an EAP method request message and a ANonce of the AP.

S430. The AP receives a third authentication message sent by the terminal, where the third authentication message includes an EAP method response message, a field value SNonce of the terminal, and a first MIC, the first MIC is generated by the terminal according to a first PTK for protecting the third authentication message, and the first PTK is generated by the terminal according to the ANonce, the SNonce, and an acquired first MSK.

S440. The AP generates a second PTK according to the ANonce, the SNonce, and an acquired second PMK.

S450. The AP sends a fourth authentication message to the terminal when authenticating, according to the second PTK, that the first MIC is correct, where the fourth authentication message includes an EAP-Success message, configuration information configured by the AP for the terminal, and a second MIC, and the second MIC is generated by the AP according to the second PTK for protecting the fourth authentication message, so that the terminal authenticates the second MIC according to the first PTK.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

It should be understood that, for a successful EAP authentication procedure, the terminal and the AP should acquire the same PMK, and acquire the same PTK based on this. That is, the first PMK should be the same as the second PMK, and the first PTK should be the same as the second PTK.

Optionally, as shown in FIG. 5, in this embodiment, when the terminal authenticates that the second MIC is correct, the method 400 further includes:

S460. The AP receives a fifth authentication message that is sent by the terminal when it authenticates that the second MIC is correct, where the fifth authentication message includes a fourth MIC, and the fourth MIC is generated by the terminal according to the first PTK for protecting the fifth authentication message.

Optionally, the configuration information includes an association identifier AID and/or a group transient key GTK.

Optionally, the first authentication message includes an EAP response identifier message, where the EAP response identifier message includes the user identifier.

In the embodiment of the present invention, after the AP receives the first authentication message sent by the terminal, the method 400 further includes the following. The AP sends a first Access Request message to an authentication server AS, where the first Access Request message includes the user identifier. The AP also receives a first Access Accept message that is sent by the AS when it determines that the user identifier exists.

In the embodiment of the present invention, after the AP receives the third authentication message sent by the terminal. In the method 400, the AP sends a second Access Request message to the AS, where the second Access Request message includes information in the EAP method response message. The AP receives a second access accept message that is sent by the AS when it successfully authenticates the terminal, where the second access accept message includes authentication success information and the PMK.

In this embodiment, the IP address of the terminal may be allocated by a network-side device, and may also be acquired by the AP according to the DHCP protocol. When the IP address of the terminal is allocated by the network-side device, the first Access Accept message includes a first IP address allocated by the AS for the terminal, and the fourth authentication message further includes the first IP address. When the IP address of the terminal is allocated by the AP according to the DHCP protocol, after the AP receives the first authentication message sent by the terminal. In the method 400, the AP sends a DHCP Discovery message and receives a DHCP Offer message. The DHCP Offer message includes the server identifier of a DHCP server sending the DHCP Offer message and a second IP address allocated by the DHCP server.

In addition, before the AP sends the fourth authentication message to the terminal. In the method 400, the AP sends a DHCP Request message receives a DHCP ACK message sent by a selected DHCP server.

Optionally, the first authentication message further includes the DHCP Discovery message; the second authentication message further includes the DHCP Offer message, where the DHCP Offer message includes the server identifier of the DHCP server sending the DHCP Offer message and the second IP address allocated by the DHCP server; the third authentication message further includes the DHCP Request message; and the fourth authentication message further includes the DHCP ACK message sent by the selected DHCP server.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

Figure 6:
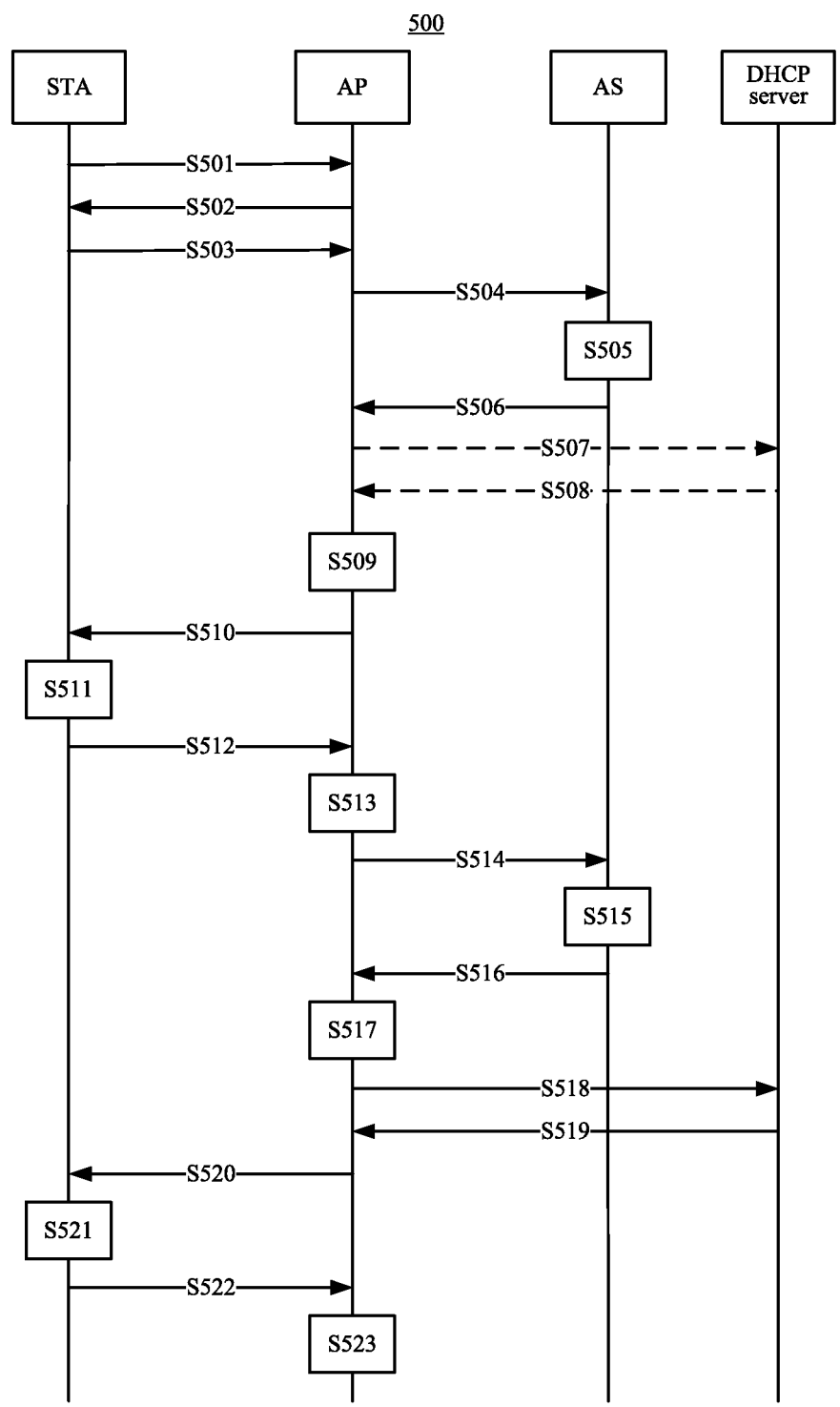
FIG. 6 is another schematic flow chart of a method for link setup according to another embodiment of the present invention.

It should be understood that in the embodiment of the present invention, EAP methods include multiple EAP-based authentication methods, for example, EAP-AKA and EAP-TLS. With reference to FIG. 6, the following describes a method for link setup according an embodiment of the present invention by taking the EAP-AKA authentication method as an example. It should be understood that in the embodiment of the present invention, EAP-AKA is taken only as an example for description, and this does not impose any restriction on the embodiment of the present invention.

As shown in FIG. 6, the method 500 includes the following steps.

S501. After detecting a required AP, an STA sends an A1 message to the AP, where in the A1 message, an Algorithm parameter is used to specify that a method for initial link setup of the present invention is used, and an RSN information element specifies that an EAP mechanism is used. The STA wants to use an EAP authentication mechanism. Therefore, the A1 message carries an EAP start message.

S502. After receiving the A1 message, the AP returns an A2 message to the STA. The Algorithm value in the A2 message is the same as that in the A1 message. The AP supports an EAP method. Therefore, the AP enables the A2 message to carry an EAP-Request/ID message.

S503. The STA sends an A3 message to the AP. The A3 message includes an EAP-Response/ID message. The EAP-Response/ID message includes a user identifier User-ID. If the STA acquires an IP address by using DHCP, the A3 message includes a DHCP Discovery message.

S504. After receiving the A3 message, the AP forwards the User-ID to an AS.

S505. The AS receives the User-ID from the AP, and if the User-ID exists, generates an AKA vector or acquires an already-generated AKA vector, calculates an MSK and a key K_aut that is used to protect a message in the AKA authentication method, and obtains a PMK according to the MSK.

The AKA vector is a term in the AKA authentication method. One AKA is generated for one User-ID. The vector includes a random number RAND, an authentication key AUTN that allows the STA to authenticate the AS, a value RES that allows the AS to authenticate the STA, and some other related data. Both the AUTN and the RES are results of a calculation involving data such as the random number RAND and a shared key. The key K_aut that is used to protect a message is also obtained through calculation involving the random number RAND and the shared key.

S506. The AS sends the first message of an authentication procedure to the AP to start the authentication procedure, where the first message includes the random number RAND and the AUTN in the AKA vector, information such as the RAND and the AUTN is protected by using the key K_aut, and a message authentication code MAC1 is generated. The AS may further include a preallocated IP address in the first message.

S507 and S508. If the A3 message includes the DHCP Discovery message, and the AS does not preallocate an IP address for the STA in the message in S506, a DHCP proxy module of the AP sends the DHCP Discovery message, and receives a DHCP Offer message. Details are not described herein.

S509. After receiving the first message of the authentication procedure sent by the AS, if the message includes a preallocated IP address, the AP reserves the IP address or reserves an IP address acquired from the DHCP Offer message, and prepares to send it to the STA in a subsequent step.

S510. The AP sends an A4 message to the STA, where the A4 message includes a ANonce of the AP, an EAP-Request/AKA-Challenge message, and an integrity code MIC of the A4 message, and the A4 message may further include the DHCP Offer message. The EAP-Request/AKA-Challenge message includes the RAND, AUTN, and MAC1 data generated by the AS.

S511. After receiving the A4 message, the STA acquires data such as the RAND from the EAP-Request/AKA-Challenge message, authenticates the correctness of the AUTN, obtains an MSK and a K_aut through calculation according to the RAND and the shared key if the AUTN is correct, and then authenticates whether the MAC1 is correct by using the K_aut. If the authentication on the AUTN and the MAC1 is successful, the STA successfully authenticates the AS. In this case, the STA obtains a PMK according to the MSK, and thereby may calculate a PTK by using data such as the PMK, an SNonce, and the ANonce.

S512. After successfully authenticating the AS and successfully authenticating the MIC of the A4 message, the STA sends an A5 message to the AP, where the A5 message includes an EAP-Response/AKA-Challenge message, the SNonce, and an MIC. If the STA acquires an IP address by using the DHCP protocol, the A5 message may include a DHCP Request message. The EAP-Response/AKA-Challenge message includes an RES and a MAC2, where the RES is calculated by the STA according to the RAND, the shared key, and the like, and the MAC2 is generated by performing integrity protection for data such as the RAND in the EAP-Response/AKA Challenge message using the K_aut.

S513. After receiving the A5 message, the AP buffers content in the message and the MIC of the message, and delays authentication on the MIC.

S514. The AP sends a message to the AS, where the message bears information in the EAP-Response message in the A5 message, that is, the RES and the MAC2.

S515. The AS authenticates the RES and the MAC2, that is, compares the RES in its own AKA vector with the RES in the message, and further authenticates the MAC2 by using the K_aut if the two RESs are the same.

S516. If the AS successfully authenticates the RES and the MAC2, it successfully authenticates the STA, and sends an authentication success message to the AP, where the authentication success message includes the PMK.

S517. After receiving the authentication success message sent by the AS, the AP acquires the PMK, calculates a PTK according to its own ANonce, the SNonce in the A5 message, and MACs of the AP and the STA, and authenticates the MIC of the A5 message by using the PTK. If the authentication is successful, continue the following procedure; otherwise, feed back an authentication failure to the AS.

S518 and S519. If the AP acquires an IP address for the STA by using the DHCP protocol, it forwards the DHCP Request message or generates a new DHCP Request message, and receives a DHCP ACK message. Details are not described herein.

S520. The AP sends an A6 message to the STA, where the A6 message includes an EAP-Success message, an association identifier AID allocated by the AP for the STA, a group key GTK, and an MIC etc., and the A6 message may further include the DHCP ACK message. The GTK and the information related to the GTK are encrypted by using the PTK. According to the present invention, the AID in the A6 message may also be encrypted by using the PTK and then transmitted. In this step, the AP may further include other information specified by the AP, for example, association expiration time and the maximum idle duration.

S521. After receiving the A6 message, the STA authenticates the MIC in the A6 message. If the authentication is successful, the procedure is continued with the subsequent step; otherwise, the STA sends an authentication failure message or makes no response to the AP. If the authentication on the MIC of the A6 message is successful, the STA acquires information such as the AID and the GTK from the A6 message. If the A6 message includes the DHCP ACK message, the STA determines that an IP address is acquired.

S522. After successfully authenticating the MIC in the A6 message, the STA sends an A7 message to the AP, where the A7 message includes an MIC, may include the SNonce, and may also include some other information. The A7 message functions to notify the AP that the A6 message is received, and is the last message on an air interface in the whole procedure.

S523. After receiving the A7 message, the AP may authenticate the MIC of the A7 message according to common practice, and if the authentication fails, may release the association with the STA, and notify the AS that the whole authentication procedure fails. The releasing the association is reclaiming the AID allocated to the STA, deleting STA-related authentication information such as the PTK, and that the AP will refuse to receive or make no response to a message subsequently sent by the STA.

It should be understood that, the sequence numbers of the above steps do not imply an execution sequence, and the execution sequence of the steps should be determined according to the functions and internal logic, which is not intended to limit the implementation process of the embodiments of the present invention in any way.

It should be understood that S501 and S502 can be skipped. In this case, the information included in the A1 message may be included in the A3 message, and the information included in the A2 message may be included in the A4 message. That is, functions implemented by the A1 message and the A2 message are completed by the A3 message and the A4 message, so that fewer messages are used in the initial link setup procedure, thereby saving more required time.

In the method 500 for link setup by using the EAP-AKA authentication method according to the embodiment of the present invention, the AS may obtain an MSK through calculation before sending challenge information to the STA. In this situation, the A3 message in S503 needs to carry the SNonce. In this case, in S505, the AS obtains the PMK through calculation, and in S506, the AS sends the PMK together with the challenge information to the AP. In S509, the AP is capable of calculating the PTK in advance because the AP acquires the PMK in advance and acquires the SNonce from the A3 message. In S510, the A4 may include the MIC because the AP has obtained the PTK through calculation. In S513, the MIC of the A5 message can be authenticated immediately, that is, the authentication does not need to be delayed, because the AP has obtained the PTK through calculation in S509. In addition, in S516, the message in this step does not need to include the PMK because the AS has sent the PMK to the AP in S506.

Therefore, according to the method for link setup in the embodiment of the present invention, the number of air interface messages exchanged can be reduced while security and functionality of a link setup procedure are maintained, thereby shortening a link setup duration, accelerating a network access procedure for a terminal, reducing power consumption of the terminal, improving security of an air interface message, enhancing system compatibility, and improving user experience.

Figure 7:
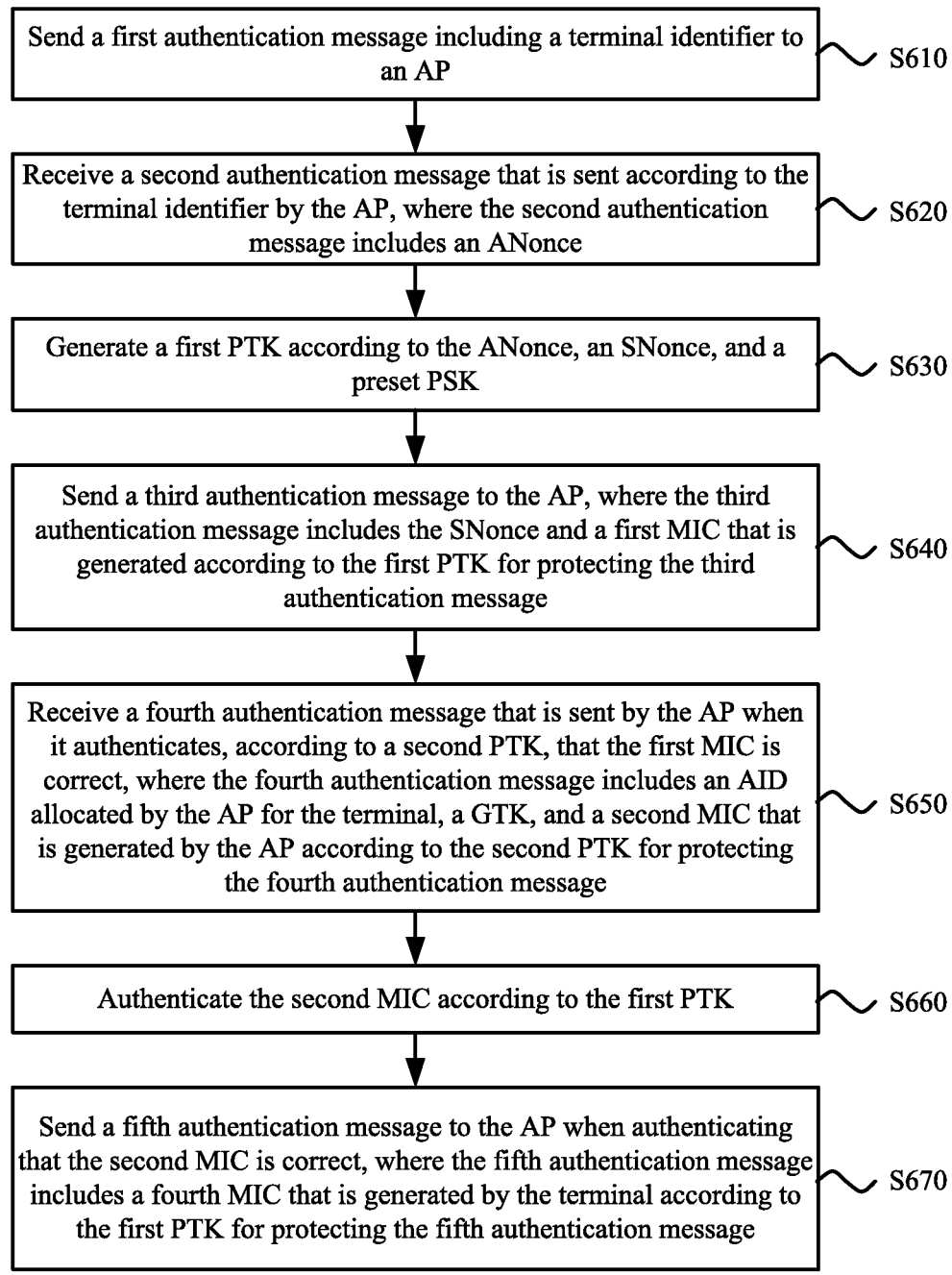
FIG. 7 is a schematic flow chart of a method for link setup according to still another embodiment of the present invention.
Figure 8:
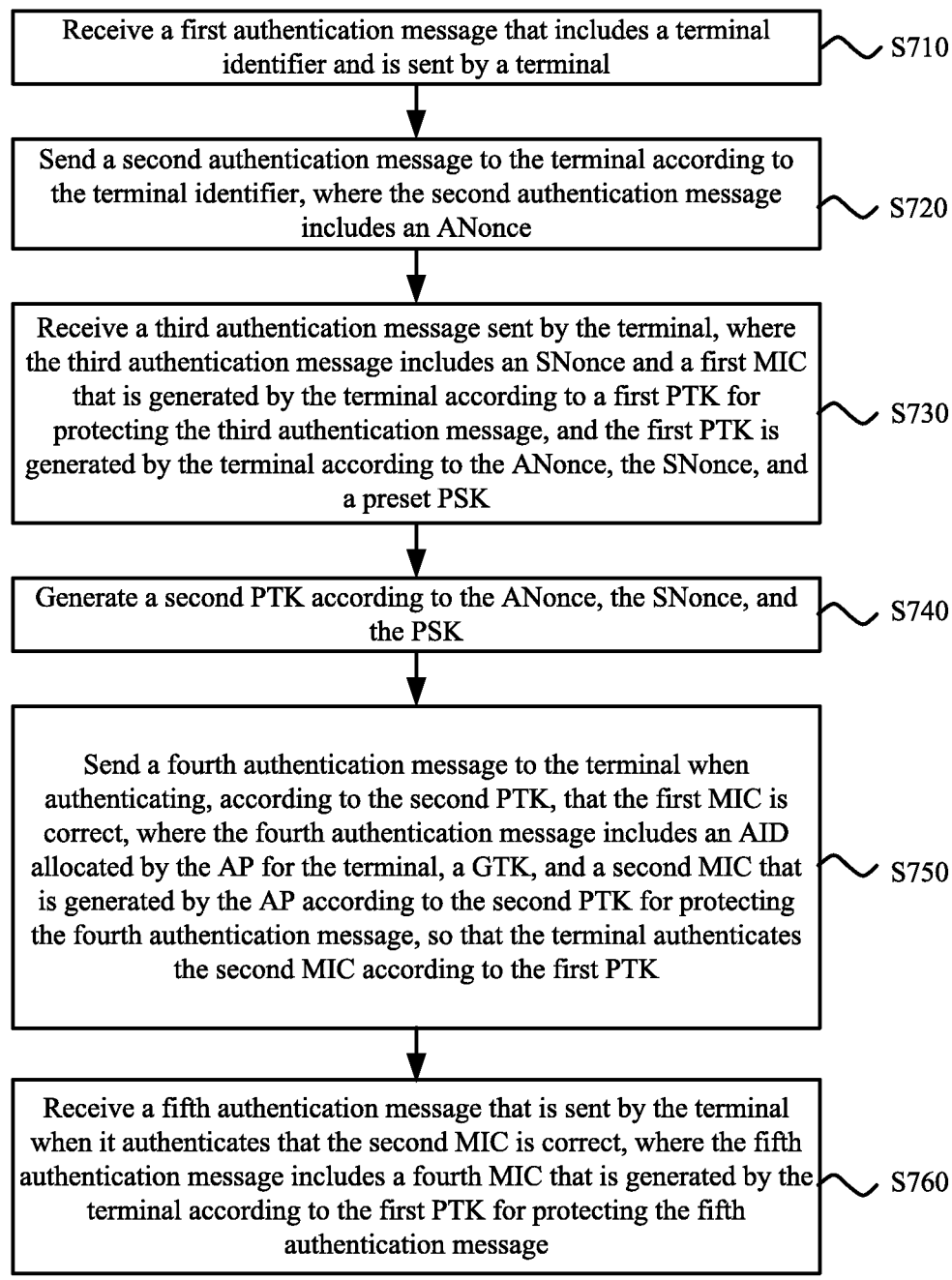
FIG. 8 is a schematic flow chart of a method for link setup according to still another embodiment of the present invention.
Figure 9:
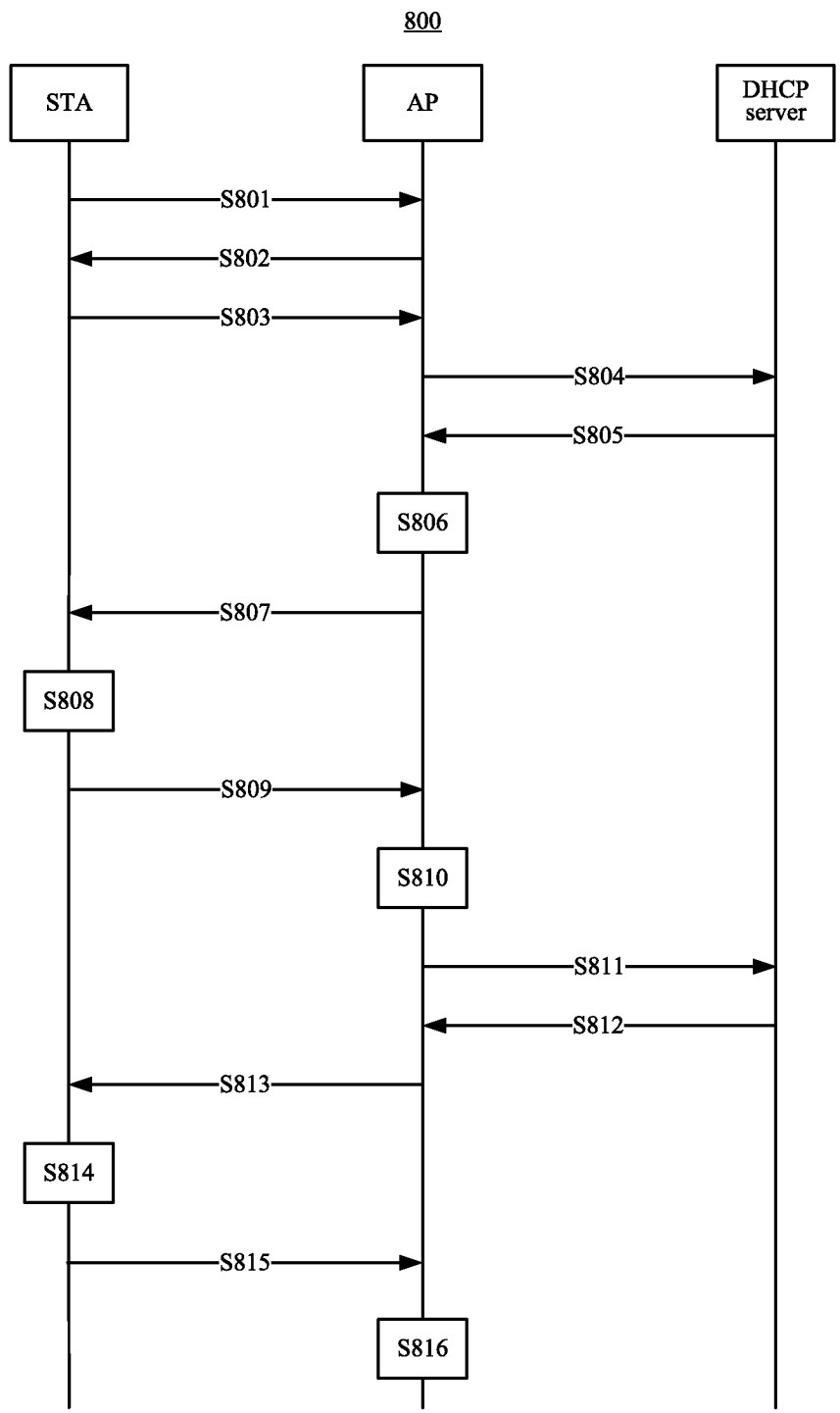
FIG. 9 is another schematic flow chart of a method for link setup according to still another embodiment of the present invention.

As shown in FIG. 7 to FIG. 9, an embodiment of the present invention further provides a method for link setup. With reference to FIG. 7 to FIG. 9, the following separately describes the method from the view of a terminal STA and an access point AP.

As shown in FIG. 7, a method 600 for link setup according to an embodiment of the present invention includes:

S610. A terminal sends a first authentication message to an access point AP, where the first authentication message includes a terminal identifier.

S620. The terminal receives a second authentication message that is sent according to the terminal identifier by the AP, where the second authentication message includes a ANonce of the AP.

S630. The terminal generates a first pairwise transient key PTK according to the ANonce, a SNonce of the terminal, and a preset pre-shared key PSK.

S640. The terminal sends a third authentication message to the AP, where the third authentication message includes the SNonce and a first message integrity code MIC, and the first MIC is generated by the terminal according to the first PTK for protecting the third authentication message.

S650. The terminal receives a fourth authentication message that is sent by the AP when it authenticates, according to a second PTK, that the first MIC is correct, where the fourth authentication message includes an association identifier AID allocated by the AP for the terminal, a group transient key GTK, and a second MIC, the second MIC is generated by the AP according to the second PTK for protecting the fourth authentication message, and the second PTK is generated by the AP according to the ANonce, the SNonce, and the PSK.

S660. The terminal authenticates the second MIC according to the first PTK.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

Optionally, as shown in FIG. 7, when the terminal authenticates that the second MIC is correct, the method 600 may further include:

S670. The terminal sends a fifth authentication message to the AP when authenticating that the second MIC is correct, where the fifth authentication message includes a fourth MIC, and the fourth MIC is generated by the terminal according to the first PTK for protecting the fifth authentication message.

In the embodiment of the present invention, the IP address of the terminal may be allocated by a network-side device, and may also be acquired by the AP according to the DHCP protocol. When the IP address of the terminal is allocated by the network-side device, the fourth authentication message further includes a first Internet Protocol IP address allocated by the AP for the terminal.

Optionally, the first authentication message further includes a Dynamic Host Configuration Protocol DHCP Discovery message; the second authentication message further includes a DHCP Offer message, where the DHCP Offer message includes the server identifier of a DHCP server sending the DHCP Offer message and a second IP address allocated by the DHCP server; the third authentication message further includes a DHCP Request message; and the fourth authentication message further includes a DHCP ACK message sent by a selected DHCP server.

Optionally, the terminal identifier includes the MAC address of the terminal and/or a user identifier.

In the embodiment of the present invention, before the AP sends the second authentication message to the STA, the AP may obtain a PMK through calculation in advance, thereby further improving security of an air interface message. In this situation, optionally, the first authentication message further includes the SNonce; and the second authentication message further includes a third MIC, where the third MIC is generated by the AP according to the second PTK for protecting the second authentication message. The sending the third authentication message to the AP includes: sending the third authentication message to the AP when authenticating, according to the first PTK, that the third MIC is correct.

Therefore, according to the method for link setup in the embodiment of the present invention, the number of air interface messages exchanged can be reduced while security and functionality of a link setup procedure are maintained, thereby shortening a link setup duration, accelerating a network access procedure for a terminal, reducing power consumption of the terminal, improving security of an air interface message, enhancing system compatibility, and improving user experience.

As shown in FIG. 8, a method 700 for link setup according to an embodiment of the present invention includes:

S710. An AP receives a first authentication message sent by a terminal, where the first authentication message includes a terminal identifier.

S720. The AP sends a second authentication message to the terminal according to the terminal identifier, where the second authentication message includes a ANonce of the AP.

S730. The AP receives a third authentication message sent by the terminal, where the third authentication message includes a SNonce of the terminal and a first MIC, the first MIC is generated by the terminal according to a first PTK for protecting the third authentication message, and the first PTK is generated by the terminal according to the ANonce, the SNonce, and a preset PSK.

S740. The AP generates a second PTK according to the ANonce, the SNonce, and the PSK.

S750. Send a fourth authentication message to the terminal when authenticating, according to the second PTK, that the first MIC is correct, where the fourth authentication message includes an association identifier AID allocated by the AP for the terminal, a group transient key GTK, and a second MIC, and the second MIC is generated by the AP according to the second PTK for protecting the fourth authentication message, so that the terminal authenticates the second MIC according to the first PTK.

Therefore, according to the method for link setup in the embodiment of the present invention, the number of air interface messages exchanged is reduced while security and functionality of a link setup procedure are maintained, thereby shortening a link setup duration, reducing power consumption of a terminal, and improving user experience.

Optionally, as shown in FIG. 8, when the terminal authenticates that the second MIC is correct, the method 700 may further include:

S760. The AP receives a fifth authentication message that is sent by the terminal when it authenticates that the second MIC is correct, where the fifth authentication message includes a fourth MIC, and the fourth MIC is generated by the terminal according to the first PTK for protecting the fifth authentication message.

In the embodiment of the present invention, the IP address of the terminal may be allocated by a network-side device, and may also be acquired by the AP according to the DHCP protocol. When the IP address of the terminal is allocated by the network-side device, the fourth authentication message further includes a first Internet Protocol IP address allocated by the AP for the terminal. When the IP address of the terminal is acquired by the AP according to the DHCP protocol, after the AP receives the first authentication message sent by the terminal, the method 700 further includes sending a DHCP Discovery message; and receiving a DHCP Offer message, where the DHCP Offer message includes the server identifier of a DHCP server sending the DHCP Offer message and a second IP address allocated by the DHCP server.

Before the AP sends the fourth authentication message to the terminal, the method 700 further includes sending a DHCP Request message; and receiving a DHCP ACK message sent by a selected DHCP server.

Optionally, the first authentication message further includes the Dynamic Host Configuration Protocol DHCP Discovery message. The second authentication message further includes the DHCP Offer message, where the DHCP Offer message includes the server identifier of the DHCP server sending the DHCP Offer message and the second IP address allocated by the DHCP server. The third authentication message further includes the DHCP Request message; and the fourth authentication message further includes the DHCP ACK message sent by the selected DHCP server.

Optionally, the terminal identifier includes the MAC address of the terminal and/or a user identifier.

Taking the embodiment illustrated in FIG. 9 as an example, the following describes in detail a method 800 for link setup by using the PSK authentication mechanism. The PSK authentication mechanism is actually an authentication mechanism in which an EAP authentication procedure is skipped. In the related specification, if the EAP authentication procedure is not performed, a preset PSK is directly used as a PMK to perform a four-way handshake. The whole link setup procedure also includes procedures such as 802.11 authentication (open system), association, four-way handshake, and IP allocation. If the four-way handshake is performed successfully, it indicates that both parties have the same PSK (serving as the PMK), which is equivalent to completing mutual authentication. The PSK authentication mechanism is generally applied in simple network deployment, and an AP directly completes authentication on an STA, that is, the AP is an AS.

As shown in FIG. 9, the method 800 includes the following steps.

S801. An STA sends an A1 message to the AP, where the A1 message specifies that a method for link setup of the present invention is used, and specifies that the PSK authentication mechanism is used. Specifically, an Algorithm parameter is used to specify that a method for fast initial link setup of the present invention is used, and a parameter in an RSN information element is used to specify the authentication mechanism as the PSK. When the STA specifies that the PSK authentication mechanism is used, the A1 message does not need to carry an EAP message.

S802. After receiving the A1 message, the AP sends an A2 message to the STA. The Algorithm value in the A2 message is the same as that in the A1 message.

S803. The STA sends an A3 message to the AP. The A3 message may include the MAC address of the terminal and/or a user identifier User-ID. If the STA acquires an IP address by using DHCP, the A3 message includes a DHCP Discovery message.

After receiving the A3 message, if the A3 message includes the User-ID, the AP uses the User-ID as the identifier of the STA; otherwise, the MAC address of the STA is used as the identifier of the STA. If the identifier of the STA does not exist, the AP ends the procedure; otherwise, it continues to perform the following step.

S804 and S805. If the AP does not directly allocate an IP address for the STA, as a DHCP proxy, the AP forwards the DHCP Discovery message or generates a new DHCP Discovery message, and receives a DHCP Offer message. Details are not described herein.

S807. The AP sends an A4 message to the STA, where the A4 message includes an ANonce of the AP, and may include the DHCP Offer message.

S808. The STA acquires the ANonce from the A4 message, generates an SNonce, and may generate a first PTK by using the PSK as a PMK.

S809. The STA sends an A5 message to the AP. If the STA acquires an IP address by using the DHCP protocol, this message includes a DHCP Request message. The A5 message includes an MIC generated by protecting the A5 message using the first PTK.

S810. After receiving the A5 message, the AP uses the PSK corresponding to the STA as the PMK, calculates a second PTK by combining the received SNonce, its own ANonce, and the like, and authenticates the MIC in the A5 message by using the generated second PTK.

S811 and S812. If the AP successfully authenticates the MIC of the A5 message, and the AP acquires an IP address for the STA from a DHCP Server, forward the DHCP Request message or generate a DHCP Request message, and receive a DHCP ACK message. Details are not described herein.

S813. If the AP successfully authenticates the MIC of the A5 message, send an A6 message to the STA, where the A6 message includes an association identifier AID allocated by the AP for the STA, a group key GTK, information related to the GTK, and an MIC of the A6 message.

S814. After receiving the A6 message, the STA authenticates the MIC of the A6 message.

S815. After successfully authenticating the MIC of the A6 message, the STA sends an A7 message to the AP, where the A7 message includes an MIC, may include the SNonce, and may also include some other information.

S816. After receiving the A7 message, the AP may authenticate the MIC of the A7 message according to common practice.

In the foregoing procedure, the four messages A4, A5, A6, and A7 are basically similar to the original four-way handshake procedure and implement the function of four-way handshake. The A3, A4, A5, and A6 messages include DHCP messages to complete IP address allocation. The A6 message includes the AID to complete a function originally completed in an association procedure. Therefore, corresponding functions can be completed by using fewer air interface messages, thereby improving efficiency. It should be understood that the A1, A2, and A7 messages can be omitted in practice.

In the embodiment of the present invention, optionally, in S803, the STA enables the A3 message to carry the SNonce. The method 800 further includes S806 in which the AP directly uses the PSK as the PMK, acquires the SNonce from the A3 message, and obtains the PTK through calculation in advance. In S807, the A4 message may carry an MIC because the AP has obtained the PTK through calculation. In S808, the STA is capable of obtaining the PTK through calculation and authenticating the MIC in the A4 message because the A4 message carries the MIC and the STA acquires the ANonce from the A4 message.

It should be understood that, the sequence numbers of the above steps do not imply an execution sequence, and the execution sequence of the steps should be determined according to the functions and internal logic, which is not intended to limit the implementation process of the embodiments of the present invention in any way.

Therefore, according to the method for link setup in the embodiment of the present invention, the number of air interface messages exchanged can be reduced while security and functionality of a link setup procedure are maintained, thereby shortening a link setup duration, accelerating a network access procedure for a terminal, reducing power consumption of the terminal, improving security of an air interface message, enhancing system compatibility, and improving user experience.

The foregoing describes in detail the method according to the embodiment of the present invention with reference to FIG. 2 and FIG. 9. The following describes in detail an apparatus according to an embodiment of the present invention with reference to FIG. 10 to FIG. 18.

Figure 10:
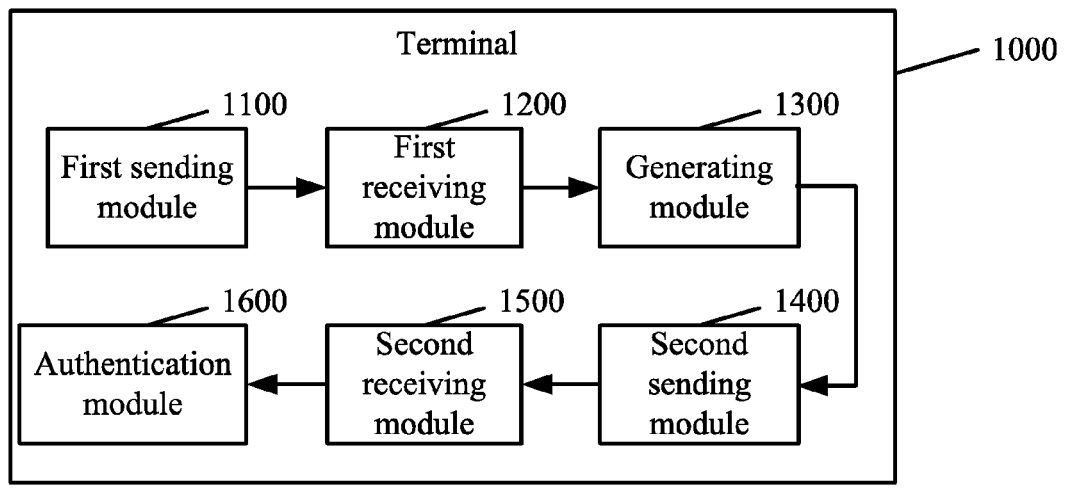
FIG. 10 is a schematic block diagram of a terminal according to an embodiment of the present invention.

FIG. 10 is a schematic block diagram of a terminal 1000 according to an embodiment of the present invention. As shown in FIG. 10, the terminal 1000 includes a number of modules. A first sending module 1100 is configured to send a first authentication message to an AP, where the first authentication message includes a user identifier. A first receiving module 1200 is configured to receive a second authentication message that is sent according to the user identifier by the AP. The second authentication message includes an Extensible Authentication Protocol EAP method request message and an ANonce of the AP. A generating module 1300 is configured to generate a first pairwise transient key PTK according to the ANonce, a SNonce of the terminal, and an acquired first main session key MSK. A second sending module 1400 is configured to send a third authentication message to the AP. The third authentication message includes an EAP method response message, the SNonce, and a first message integrity code MIC, and the first MIC is generated by the terminal according to the first PTK for protecting the third authentication message.

A second receiving module 1500 is configured to receive a fourth authentication message that is sent by the AP when it authenticates, according to a second PTK, that the first MIC is correct. The fourth authentication message includes an EAP-Success message, configuration information configured by the AP for the terminal, and a second MIC, the second MIC is generated by the AP according to the second PTK for protecting the fourth authentication message, and the second PTK is generated by the AP according to the ANonce, the SNonce, and an acquired second pairwise master key PMK. An authentication module 1600 is configured to authenticate the second MIC according to the first PTK.

The foregoing and other operations and/or functions of each of the modules in the terminal 1000 according to the embodiment of the present invention are intended for implementing the corresponding process in the method 100 illustrated in FIG. 2, respectively. For brevity, details are not described herein.

With the terminal in the embodiment of the present invention, the number of air interface messages exchanged is reduced while security and functionality of a link setup procedure are maintained, thereby shortening a link setup duration, reducing power consumption of the terminal, and improving user experience.

Figure 11:
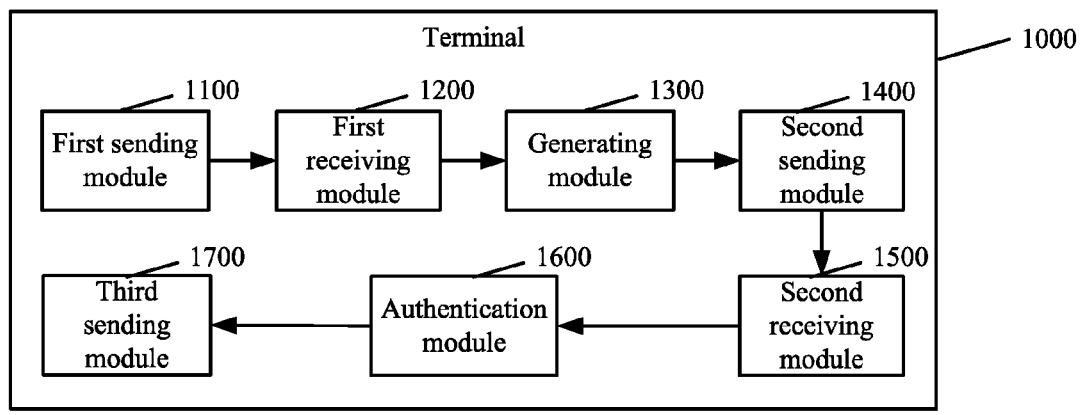
FIG. 11 is another schematic block diagram of a terminal according to an embodiment of the present invention.

Optionally, as shown in FIG. 11, the terminal 1000 further includes a third sending module 1700, which is configured to send a fifth authentication message to the AP when authenticating that the second MIC is correct. The fifth authentication message includes a fourth MIC, and the fourth MIC is generated by the terminal according to the first PTK for protecting the fifth authentication message.

Optionally, the configuration information includes an association identifier AID and/or a group transient key GTK.

Optionally, the fourth authentication message further includes a first Internet Protocol IP address allocated by a network-side device for the terminal.

Optionally, the first authentication message further includes a Dynamic Host Configuration Protocol DHCP Discovery message; the second authentication message further includes a DHCP Offer message, where the DHCP Offer message includes the server identifier of a DHCP server sending the DHCP Offer message and a second IP address allocated by the DHCP server; the third authentication message further includes a DHCP Request message; and the fourth authentication message further includes a DHCP ACK message sent by a selected DHCP server.

Optionally, the first authentication message includes an EAP response identifier message, where the EAP response identifier message includes the user identifier.

Optionally, the first authentication message further includes the SNonce; and the second authentication message further includes a third MIC, where the third MIC is generated by the AP according to the second PTK for protecting the second authentication message.

The second sending module 1400 is further configured to send the third authentication message to the AP when authenticating, according to the first PTK, that the third MIC is correct.

Therefore, with the terminal in the embodiment of the present invention, the number of air interface messages exchanged can be reduced while security and functionality of a link setup procedure are maintained, thereby shortening a link setup duration, accelerating a network access procedure for the terminal, reducing power consumption of the terminal, improving security of an air interface message, enhancing system compatibility, and improving user experience.

Figure 12:
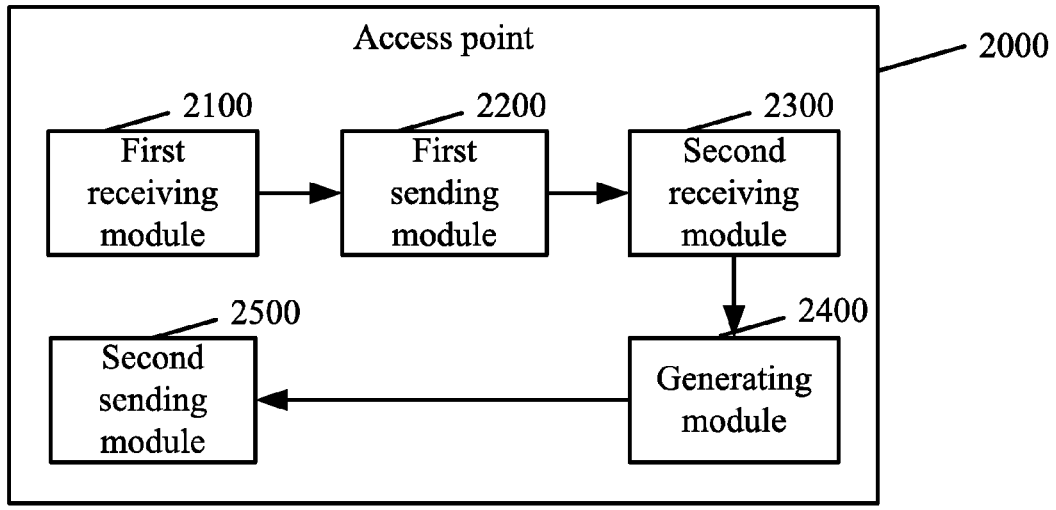
FIG. 12 is a schematic block diagram of an access point according to an embodiment of the present invention.

FIG. 12 is a schematic block diagram of an access point 2000 according to an embodiment of the present invention. As shown in FIG. 12, the access point 2000 includes a number of modules. A first receiving module 2100 is configured to receive a first authentication message sent by a terminal. The first authentication message includes a user identifier. A first sending module 2200 is configured to send a second authentication message to the terminal according to the user identifier. The second authentication message includes an EAP method request message and a ANonce of the AP.

A second receiving module 2300 is configured to receive a third authentication message sent by the terminal. The third authentication message includes an EAP method response message, a SNonce of the terminal, and a first MIC, the first MIC is generated by the terminal according to a first PTK for protecting the third authentication message, and the first PTK is generated by the terminal according to the ANonce, the SNonce, and an acquired first MSK. A generating module 2400 is configured to generate a second PTK according to the ANonce, the SNonce, and an acquired second PMK.

A second sending module 2500 is configured to send a fourth authentication message to the terminal when authenticating, according to the second PTK, that the first MIC is correct. The fourth authentication message includes an EAP-Success message, configuration information configured by the AP for the terminal, and a second MIC, and the second MIC is generated by the AP according to the second PTK for protecting the fourth authentication message, so that the terminal authenticates the second MIC according to the first PTK.

The foregoing and other operations and/or functions of each of the modules in the access point 2000 according to the embodiment of the present invention are intended for implementing the corresponding process in the method 400 illustrated in FIG. 5, respectively. For brevity, details are not described herein.

With the access point in the embodiment of the present invention, the number of air interface messages exchanged is reduced while security and functionality of a link setup procedure are maintained, thereby shortening a link setup duration, reducing power consumption of a terminal, and improving user experience.

Figure 13:
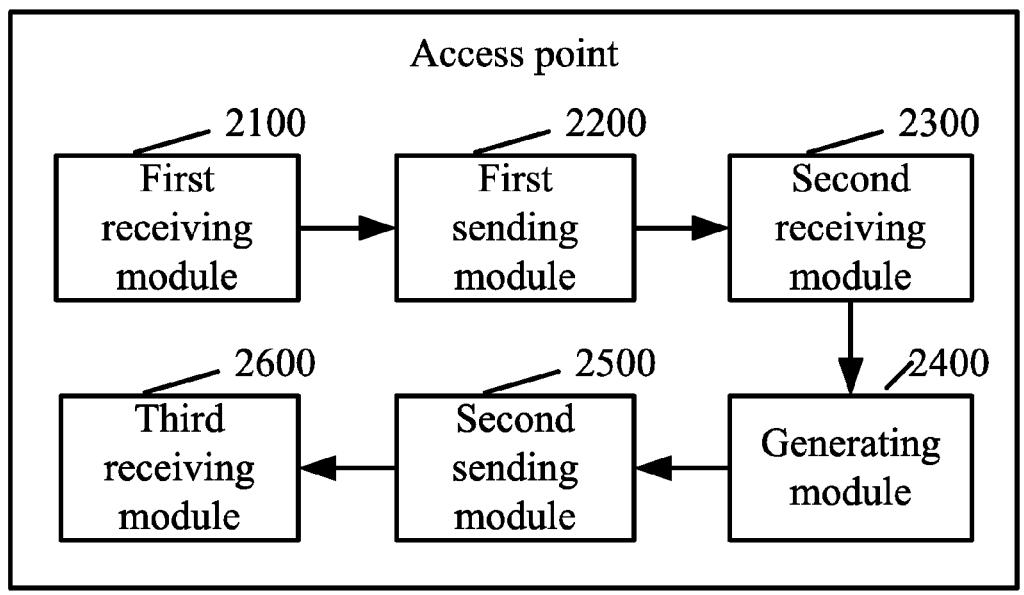
FIG. 13 is another schematic block diagram of an access point according to an embodiment of the present invention.

Optionally, as shown in FIG. 13, the access point 2000 further includes a third receiving module 2600, configured to receive a fifth authentication message that is sent by the terminal when it authenticates that the second MIC is correct, where the fifth authentication message includes a fourth MIC, and the fourth MIC is generated by the terminal according to the first PTK for protecting the fifth authentication message.

Optionally, the configuration information includes an association identifier AID and/or a group transient key GTK.

Optionally, the first authentication message includes an EAP response identifier message, where the EAP response identifier message includes the user identifier.

Figure 14:
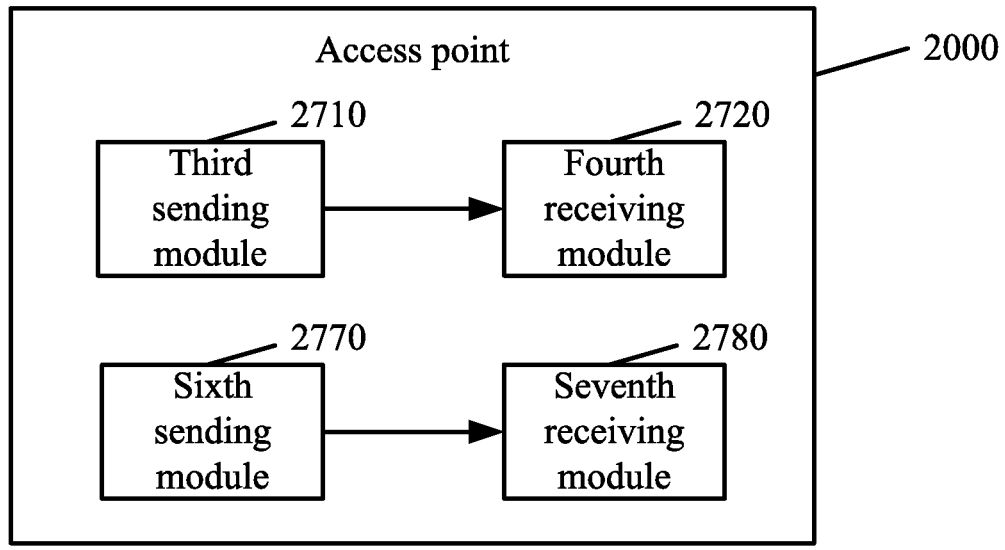
FIG. 14 is still another schematic block diagram of an access point according to an embodiment of the present invention.

Optionally, as shown in FIG. 14, the access point 2000 includes additional modules. For example, a third sending module 2710 can be configured to send a first Access Request message to an authentication server AS after the first receiving module 2100 receives the first authentication message sent by the terminal, where the first Access Request message includes the user identifier. A fourth receiving module 2720 can be configured to receive a first Access Accept message that is sent by the AS when it determines that the user identifier exists.

In the embodiment of the present invention, the IP address of the terminal may be allocated by a network-side device, and may also be acquired by the AP according to the DHCP protocol. When the IP address of the terminal is allocated by the network-side device, the first Access Accept message includes a first IP address allocated by the AS for the terminal, and the fourth authentication message further includes the first IP address.

Optionally, as shown in FIG. 14, the access point 2000 further includes a sixth sending module 2770, which is configured to send a second Access Request message to the AS after the second receiving module 2300 receives the third authentication message sent by the terminal, where the second Access Request message includes information in the EAP method response message. Optionally, the access point 2000 further includes a seventh receiving module 2780, which is configured to receive a second access accept message that is sent by the AS when it successfully authenticates the terminal, where the second access accept message includes authentication success information and the PMK.

Figure 15:
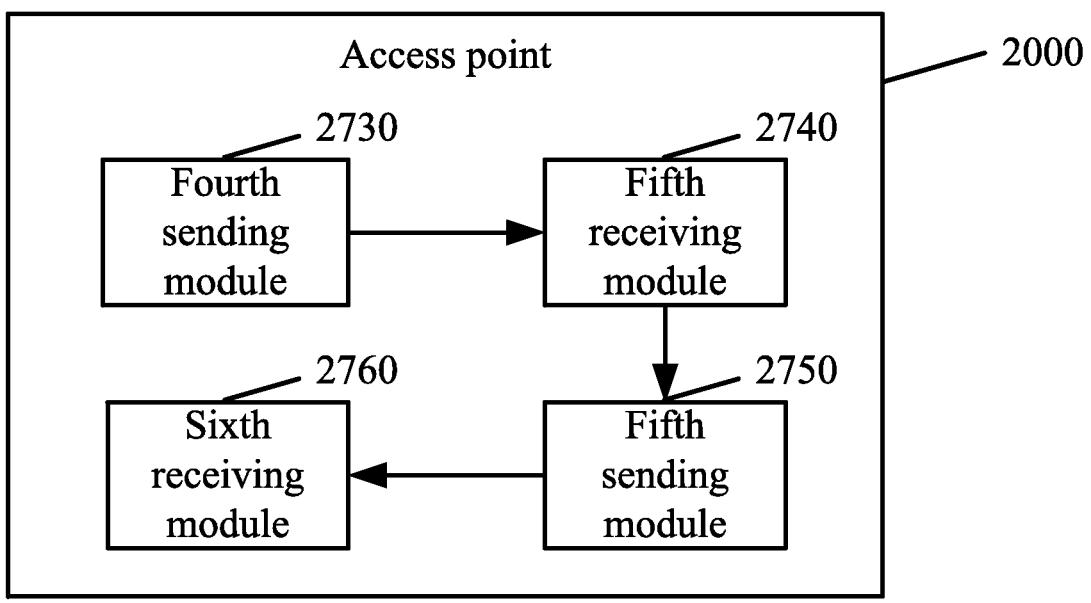
FIG. 15 is still another schematic block diagram of an access point according to an embodiment of the present invention.

Optionally, as shown in FIG. 15, the access point 2000 further includes a fourth sending module 2730, configured to send a DHCP Discovery message after the first receiving module 2100 receives the first authentication message sent by the terminal, a fifth receiving module 2740, configured to receive a DHCP Offer message, where the DHCP Offer message includes the server identifier of a DHCP server sending the DHCP Offer message and a second IP address allocated by the DHCP server, a fifth sending module 2750, configured to send a DHCP Request message before the second sending module 2500 sends the fourth authentication message to the terminal, and a sixth receiving module 2760, configured to receive a DHCP ACK message sent by a selected DHCP server.

With the access point in the embodiment of the present invention, the number of air interface messages exchanged is reduced while security and functionality of a link setup procedure are maintained, thereby shortening a link setup duration, reducing power consumption of a terminal, and improving user experience.

Figure 16:
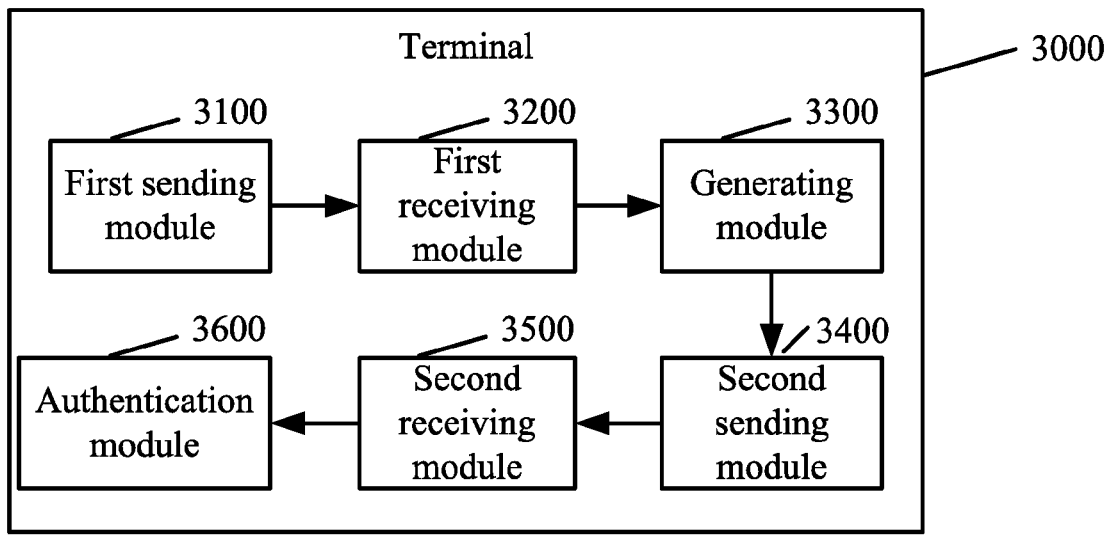
FIG. 16 is a schematic block diagram of a terminal according to another embodiment of the present invention.

FIG. 16 is a schematic block diagram of a terminal 3000 according to another embodiment of the present invention. As shown in FIG. 16, the terminal 3000 includes a first sending module 3100, configured to send a first authentication message to an access point AP, where the first authentication message includes a terminal identifier, a first receiving module 3200, configured to receive a second authentication message that is sent according to the terminal identifier by the AP, where the second authentication message includes a ANonce of the AP, a generating module 3300, configured to generate a first pairwise transient key PTK according to the ANonce, a SNonce of the terminal, and a preset pre-shared key PSK, a second sending module 3400, configured to send a third authentication message to the AP, where the third authentication message includes the SNonce and a first message integrity code MIC, and the first MIC is generated by the terminal according to the first PTK for protecting the third authentication message, a second receiving module 3500, configured to receive a fourth authentication message that is sent by the AP when it authenticates, according to a second PTK, that the first MIC is correct, where the fourth authentication message includes an association identifier AID allocated by the AP for the terminal, a group transient key GTK, and a second MIC, the second MIC is generated by the AP according to the second PTK for protecting the fourth authentication message, and the second PTK is generated by the AP according to the ANonce, the SNonce, and the PSK, and an authentication module 3600, configured to authenticate the second MIC according to the first PTK.

Optionally, when the authentication module 3600 authenticates that the second MIC is correct, the terminal 3000 further includes a third sending module, configured to send a fifth authentication message to the AP when authenticating that the second MIC is correct, where the fifth authentication message includes a fourth MIC, and the fourth MIC is generated by the terminal according to the first PTK for protecting the fifth authentication message.

In the embodiment of the present invention, the IP address of the terminal may be allocated by a network-side device, and may also be acquired by the AP according to the DHCP protocol. When the IP address of the terminal is allocated by the network-side device, the fourth authentication message further includes a first Internet Protocol IP address allocated by the AP for the terminal.

Optionally, the first authentication message further includes a Dynamic Host Configuration Protocol DHCP Discovery message; the second authentication message further includes a DHCP Offer message, where the DHCP Offer message includes the server identifier of a DHCP server sending the DHCP Offer message and a second IP address allocated by the DHCP server; the third authentication message further includes a DHCP Request message; and the fourth authentication message further includes a DHCP ACK message sent by a selected DHCP server.

Optionally, the terminal identifier includes the MAC address of the terminal and/or a user identifier, and/or another identifier having a mapping with the MAC address, for example, an IP address.

Optionally, the first authentication message further includes the SNonce; and the second authentication message further includes a third MIC, where the third MIC is generated by the AP according to the second PTK for protecting the second authentication message. The second sending module 3400 is configured to send the third authentication message to the AP when authenticating, according to the first PTK, that the third MIC is correct.

The foregoing and other operations and/or functions of each of the modules in the terminal 3000 according to the embodiment of the present invention are intended for implementing the corresponding process in the method 600 illustrated in FIG. 7, respectively. For brevity, details are not described herein.

Therefore, with the terminal in the embodiment of the present invention, the number of air interface messages exchanged can be reduced while security and functionality of a link setup procedure are maintained, thereby shortening a link setup duration, accelerating a network access procedure for the terminal, reducing power consumption of the terminal, improving security of an air interface message, enhancing system compatibility, and improving user experience.

Figure 17:
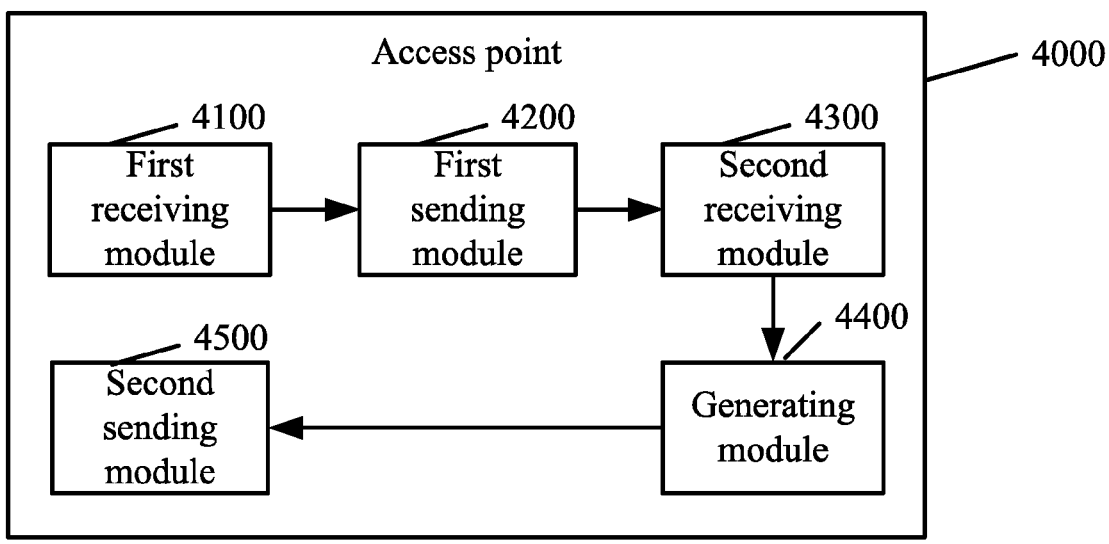
FIG. 17 is a schematic block diagram of an access point according to another embodiment of the present invention.

FIG. 17 is a schematic block diagram of an access point 4000 according to another embodiment of the present invention. As shown in FIG. 17, the access point 4000 includes a first receiving module 4100, configured to receive a first authentication message sent by a terminal, where the first authentication message includes a terminal identifier; a first sending module 4200, configured to send a second authentication message to the terminal according to the terminal identifier, where the second authentication message includes a ANonce of the AP; a second receiving module 4300, configured to receive a third authentication message sent by the terminal, where the third authentication message includes a SNonce of the terminal and a first MIC, the first MIC is generated by the terminal according to a first PTK for protecting the third authentication message, and the first PTK is generated by the terminal according to the ANonce, the SNonce, and a preset PSK; a generating module 4400, configured to generate a second PTK according to the ANonce, the SNonce, and the PSK; and a second sending module 4500, configured to send a fourth authentication message to the terminal when authenticating, according to the second PTK, that the first MIC is correct, where the fourth authentication message includes an association identifier AID allocated by the AP for the terminal, a group transient key GTK, and a second MIC, and the second MIC is generated by the AP according to the second PTK for protecting the fourth authentication message, so that the terminal authenticates the second MIC according to the first PTK.

Optionally, when the second sending module 4500 authenticates that the second MIC is correct, the access point 4000 may further include a third receiving module, configured to receive a fifth authentication message that is sent by the terminal when it authenticates that the second MIC is correct, where the fifth authentication message includes a fourth MIC, and the fourth MIC is generated by the terminal according to the first PTK for protecting the fifth authentication message.

Optionally, the first authentication message further includes a Dynamic Host Configuration Protocol DHCP Discovery message; the second authentication message further includes a DHCP Offer message, where the DHCP Offer message includes the server identifier of a DHCP server sending the DHCP Offer message and a second IP address allocated by the DHCP server; the third authentication message further includes a DHCP Request message; and the fourth authentication message further includes a DHCP ACK message sent by a selected DHCP server.

Optionally, the terminal identifier includes the MAC address of the terminal and/or a user identifier.

Figure 18:
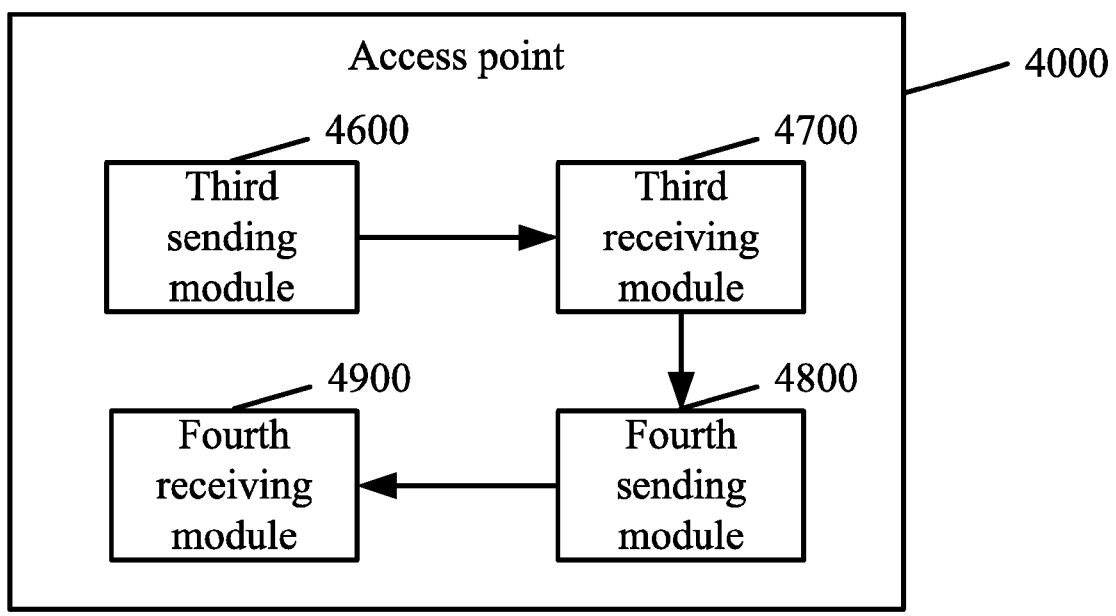
FIG. 18 is another schematic block diagram of an access point according to another embodiment of the present invention.

Optionally, as shown in FIG. 18, the access point 4000 further includes a third sending module 4600, configured to send a DHCP Discovery message; a third receiving module 4700, configured to receive a DHCP Offer message, where the DHCP Offer message includes the server identifier of a DHCP server sending the DHCP Offer message and a second IP address allocated by the DHCP server; a fourth sending module 4800, configured to send a DHCP Request message; and a fourth receiving module 4900, configured to receive a DHCP ACK message sent by a selected DHCP server.

The foregoing and other operations and/or functions of each of the modules in the access point 4000 according to the embodiment of the present invention are intended for implementing the corresponding process in the method 700 illustrated in FIG. 8, respectively. For brevity, details are not described herein.

Therefore, with the access point in the embodiment of the present invention, the number of air interface messages exchanged can be reduced while security and functionality of a link setup procedure are maintained, thereby shortening a link setup duration, accelerating a network access procedure for a terminal, reducing power consumption of the terminal, improving security of an air interface message, enhancing system compatibility, and improving user experience.

Persons of ordinary skill in the art should appreciate that, in combination with the examples described in the embodiments herein, units and algorithm steps can be implemented by electronic hardware, computer software, or a combination thereof. To clearly describe the interchangeability between the hardware and the software, the foregoing has generally described compositions and steps of every embodiment according to functions. Whether the functions are executed by hardware or software depends on the particular applications and design constraint conditions of the technical solutions. Persons skilled in the art can use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus, and method may be implemented in other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units herein may be selected according to the actual needs to achieve the objectives of the solutions of the embodiments of the present invention.

In addition, functional units in the embodiments of the present invention may be integrated into a processing unit, or each of the units may exist alone physically, or two or more units may be integrated into a unit. The integrated unit may be implemented in a form of hardware, or may be implemented in a form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in a form of software product. The computer software product is stored in a storage medium and includes several instructions for instructing a computer device (which may be a personal computer, a server, or a network device, and the like) to execute all or a part of steps of the method described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing descriptions are merely exemplary embodiments of the present invention, but not intended to limit the protection scope of the present invention. Any equivalent modification or replacement that can be easily made by persons skilled in the art without departing from the technical scope disclosed by the present invention shall fall within the protection scope of the present invention. Therefore, the protection scope of the present invention shall be subject to the protection scope of the appended claims.

What is claimed is:

1. A method for link setup, the method comprising:
sending a first authentication message to an access point (AP), wherein the first authentication message comprises a user identifier;
receiving a second authentication message which is sent by the AP according to the user identifier, wherein the second authentication message comprises an Extensible Authentication Protocol (EAP) method request message and a ANonce of the AP;
generating a first pairwise transient key (PTK) according to the ANonce, a SNonce of a terminal, and an acquired first main session key (MSK);
sending a third authentication message to the AP, wherein the third authentication message comprises an EAP method response message, the SNonce and a first message integrity code (MIC), the first MIC being generated by the terminal according to the first PTK for protecting the third authentication message;
receiving a fourth authentication message which is sent by the AP when the AP authenticates, according to a second PTK, that the first MIC is correct, wherein the fourth authentication message comprises an EAP-Success message, configuration information configured by the AP for the terminal and a second MIC, wherein the second MIC is generated by the AP according to the second PTK for protecting the fourth authentication message, and the second PTK is generated by the AP according to the ANonce the SNonce, and an acquired pairwise master key (FMK}; and
authenticating the second MIC according to the first PTK;
wherein the first authentication message further comprises the SNonce, the second authentication message further comprises a third MIC, and the third MIC is generated by the AP according to the second PTK for protecting the second authentication message; and
wherein the sending a third authentication message to the AP comprises sending the third authentication message to the AP when authenticating, according to the first PTK, that the third MIC is correct.

2. The method according to claim 1, further comprising sending a fifth authentication message to the AP when authenticating that the second MIC is correct, wherein the fifth authentication message comprises a fourth MIC, and the fourth MIC is generated by the terminal according to the first PTK for protecting the fifth authentication message.

3. The method according to claim 1, wherein the configuration information comprises an association identifier (AID) and/or a group transient key (GTK).

4. The method according to claim 1, wherein the fourth authentication message further comprises a first Internet Protocol (IP) address allocated by a network-side device for the terminal.

5. The method according to claim 1, wherein the first authentication message further comprises a Dynamic Host Configuration Protocol (DHCP) Discovery message;
wherein the second authentication message further comprises a DHCP Offer message;
wherein the DHCP Offer message comprises a server identifier of a DHCP server sending the DHCP Offer message and a second IP address allocated by the DHCP server;
wherein the third authentication message further comprises a DHCP Request message; and
the fourth authentication message further comprises a DHCP ACK message sent by a selected DHCP server.

6. The method according to claim 1, wherein the first authentication message comprises an EAP response identity message and the EAP response identity message comprises the user identifier.

7. A method for link setup, the method comprising:
receiving a first authentication message sent by a terminal, wherein the first authentication message comprises a user identifier;
sending a second authentication message to the terminal according to the user identifier, wherein the second authentication message comprises an Extensible Authentication Protocol (EAP) method request message and a ANonce of an access point (AP);
receiving a third authentication message sent by the terminal, wherein the third authentication message comprises an EAP method response message, a SNonce of the terminal, and a first message integrity code (MIC), wherein the first MIC is generated by the terminal according to a first pairwise transient key (PTK) for protecting the third authentication message and the first PTK is generated by the terminal according to the ANonce, the SNonce, and an acquired first main session key (MSK);
generating a second PTK according to the ANonce, the SNonce, and an acquired second pairwise master key (PMK); and
sending a fourth authentication message to the terminal when authenticating, according to the second PTK, that the first MIC is correct, wherein the fourth authentication message
comprises an EAP-Success message, configuration information configured by the AP for the terminal, and a second MIC, wherein the second MIC is generated by the AP according to the second PTK for protecting the fourth authentication message, so that the terminal authenticates the second MIC according to the first PTK;
wherein the first authentication message further comprises the SNonce, the second authentication message further comprises a third MIC, and the third MIC is generated by the AP according to the second PTK for protecting the second authentication message; and
wherein the receiving a third authentication message sent by the terminal comprises receiving the third authentication message sent by the terminal when authenticating, according to the first PTK, that the third MIC is correct.

8. The method according to claim 7, further comprising receiving a fifth authentication message which is sent by the terminal when the terminal authenticates that the second MIC is correct, wherein the fifth authentication message comprises a fourth MIC, and the fourth MIC is generated by the terminal according to the first PTK for protecting the fifth authentication message.

9. The method according to claim 7, wherein the configuration information comprises an association identifier (AID) and/or a group transient key (GTK).

10. The method according to claim 7, wherein after the receiving the first authentication message sent by the terminal, the method further comprises:
sending a first Access Request message to an authentication server AS, wherein the first Access Request message comprises the user identifier; and
receiving a first Access Accept message that is sent by the AS when the AS determines that the user identifier exists.

11. The method according to claim 10, wherein the first Access Accept message comprises a first IP address allocated by the AS for the terminal, and the fourth authentication message further comprises the first IP address.

12. The method according to claim 7, wherein after the receiving the first authentication message sent by the terminal, the method further comprises:
sending a Dynamic Host Configuration Protocol (DHCP) Discovery message; and
receiving a DHCP Offer message, wherein the DHCP Offer message comprises a server identifier of a DHCP server sending the DHCP Offer message and a second IP address allocated by the DHCP server; and
wherein before the sending the fourth authentication message to the terminal, the method further comprises:
sending a DHCP Request message; and
receiving a DHCP ACK message sent by a selected DHCP server.

13. The method according to claim 7, wherein the first authentication message further comprises the DHCP Discovery message;
wherein the second authentication message further comprises the DHCP Offer message;
wherein the DHCP Offer message comprises the server identifier of the DHCP server sending the DHCP Offer message and the second IP address allocated by the DHCP server;
wherein the third authentication message further comprises the DHCP Request message; and
wherein the fourth authentication message further comprises the DHCP ACK message sent by the selected DHCP server.

14. The method according to claim 7, further comprising:
sending a second Access Request message to the AS, wherein the second Access Request message comprises information in the EAP method response message; and
receiving a second access accept message that is sent by the AS when the AS successfully authenticates the terminal, wherein the second access accept message comprises authentication success information and the PMK.

15. The method according to claim 7, wherein the first authentication message comprises an EAP response identity message, and the EAP response identity message comprises the user identifier.

16. A method for link setup, the method comprising:
sending a first authentication message to an access point (AP), wherein the first authentication message comprises a terminal identifier;
receiving a second authentication message which is sent by the AP according to the terminal identifier, wherein the second authentication message comprises a ANonce of the AP;

generating a first pairwise transient key (PTK) according to the ANonce, a SNonce of a terminal, and a preset pre-shared key (PSK);
sending a third authentication message to the AP, wherein the third authentication message comprises the SNonce and a first message integrity code (MIC), the first MIC being generated by the terminal according to the first PTK for protecting the third authentication message;
receiving a fourth authentication message which is sent by the AP when the AP authenticates, according to a second PTK, that the first MIC is correct, wherein the fourth authentication message comprises an association identifier (AID) allocated by the AP for the terminal, a group transient key (GTK), and a second MIC, wherein the second MIC is generated by the AP according to the second PTK for protecting the fourth authentication message, and the
second PTK is generated by the AP according to the ANonce, the SNonce, and the PSK; and
authenticating the second MIC according to the first PTK;
wherein the first authentication message further comprises the SNonce, the second authentication message further comprises a third MIC, and the third MIC is generated by the AP according to the second PTK for protecting the second authentication message; and
wherein the sending the third authentication message to the AP comprises sending the third authentication message to the AP when authenticating, according to the first PTK, that the third MIC is correct.

17. The method according to claim 16, wherein the fourth authentication message further comprises a first Internet Protocol (IP) address allocated by the AP for the terminal.

18. The method according to claim 16, wherein the first authentication message further comprises a Dynamic Host Configuration Protocol (DHCP) Discovery message;
wherein the second authentication message further comprises a DHCP Offer message;
wherein the DHCP Offer message comprises a server identifier of a DHCP server sending the DHCP Offer message and a second IP address allocated by the DHCP server;
wherein the third authentication message further comprises a DHCP Request message; and
wherein the fourth authentication message further comprises a DHCP ACK message sent by a selected DHCP server.

19. A method for link setup, the method comprising:
receiving a first authentication message sent by a terminal, wherein the first authentication message comprises a terminal identifier;
sending a second authentication message to the terminal according to the terminal identifier, wherein the second authentication message comprises a ANonce of an access point (AP);
receiving a third authentication message sent by the terminal, wherein the third authentication message comprises a SNonce of the terminal and a first MIC, the first MIC is generated by the terminal according to a first PTK for protecting the third authentication message, and the first PTK is generated by the terminal according to the ANonce, the SNonce, and a preset PSK;
generating a second PTK according to the ANonce, the SNonce, and the PSK; and
sending a fourth authentication message to the terminal that the first MIC is correct when authenticating according to the second PTK, wherein the fourth authentication message comprises an association identifier (AID) allocated by the AP for the terminal, a group transient key (GTK), and a second MIC, and the second MIC is generated by the AP according to the second PTK for protecting the fourth authentication message, so that the terminal authenticates the second MIC according to the first PTK;

wherein the first authentication message further comprises the SNonce, the second authentication message further comprises a third MIC, and the third MIC is generated by the AP according to the second PTK for protecting the second authentication message; and wherein the receiving the third authentication message sent by the terminal comprises receiving the third authentication message sent by the terminal when authenticating, according to the first PTK, that the third MIC is correct.

20. The method according to claim 19, wherein the fourth authentication message further comprises a first IP address allocated by the AP for the terminal.

21. The method according to claim 19, after the receiving a first authentication message sent by a terminal, the method further comprising:
sending a DHCP Discovery message; and
receiving a DHCP Offer message, wherein the DHCP Offer message comprises a server identifier of a DHCP server sending the DHCP Offer message and a second IP address allocated by the DHCP server; and
wherein before the sending the fourth authentication message to the terminal, the method further comprises:
sending a DHCP Request message; and
receiving a DHCP ACK message sent by a selected DHCP server.

22. The method according to claim 19, wherein the terminal identifier comprises a MAC address of the terminal and/or a user identifier.

23. A terminal, comprising:
a first sending module, configured to send a first authentication message to an access point (AP), wherein the first authentication message comprises a user identifier;
a first receiving module, configured to receive a second authentication message that is sent according to the user identifier by the AP, wherein the second authentication message comprises an Extensible Authentication Protocol (EAP) method request message and a ANonce of the AP;
a generating module, configured to generate a first pairwise transient key (PTK) according to the ANonce, a SNonce of the terminal, and an acquired first main session key (MSK);
a second sending module, configured to send a third authentication message to the AP, wherein the third authentication message comprises an EAP method response message, the
SNonce, and a first message integrity code (MIC), and the first MIC is generated by the terminal according to the first PTK for protecting the third authentication message;
a second receiving module, configured to receive a fourth authentication message that is sent by the AP when the AP authenticates, according to a second PTK, that the first MIC is correct, wherein the fourth authentication message comprises an EAP-Success message, configuration information configured by the AP for the terminal, and a second MIC, wherein the second MIC is generated by the AP according to the second PTK for protecting the fourth authentication message, and the second PTK is generated by the AP according to the ANonce, the SNonce, and an acquired pairwise master key (PMK); and
an authentication module, configured to authenticate the second MIC according to the first PTK;

wherein the first authentication message further comprises the SNonce, the second authentication message further comprises a third MIC, and the third MIC is generated by the AP according to the second PTK for protecting the second authentication message; and wherein the sending a third authentication message to the AP comprises sending the third authentication message to the AP when authenticating, according to the first PTK, that the third MIC is correct.

24. The terminal according to claim 23, further comprising a third sending module, configured to send a fifth authentication message to the AP when authenticating that the second MIC is correct, wherein the fifth authentication message comprises a fourth MIC, and the fourth MIC is generated by the terminal according to the first PTK for protecting the fifth authentication message.

25. An access point (AP), comprising:
a first receiving module, configured to receive a first authentication message sent by a terminal, wherein the first authentication message comprises a user identifier;
a first sending module, configured to send a second authentication message to the terminal according to the user identifier, wherein the second authentication message comprises an EAP method request message and a ANonce of the AP;
a second receiving module, configured to receive a third authentication message sent by the terminal, wherein the third authentication message comprises an EAP method response message, a SNonce of the terminal, and a first MIC, wherein the first MIC is generated by the terminal according to a first PTK for protecting the third authentication message, and the first PTK is generated by the terminal according to the ANonce, the SNonce, and an acquired first MSK;
a generating module, configured to generate a second PTK according to the ANonce, the SNonce, and an acquired pairwise master key (PMK); and
a second sending module, configured to send a fourth authentication message to the terminal when authenticating, according to the second PTK, that the first MIC is correct, wherein the fourth authentication message comprises an EAP-Success message, configuration information configured by the AP for the terminal, and a second MIC, wherein the second MIC is generated by the AP according to the second PTK for protecting the fourth authentication message, so that the terminal authenticates the second MIC according to the first PTK;

wherein the first authentication message further comprises the SNonce, the second authentication message further comprises a third MIC, and the third MIC is generated by the AP according to the second PTK for protecting the second authentication message; and wherein the receiving a third authentication message sent by the terminal comprises receiving the third authentication message sent by the terminal when authenticating, according to the first PTK, that the third MIC is correct.

26. The access point according to claim 25, further comprising a third receiving module, configured to receive a fifth authentication message that is sent by the terminal when the terminal authenticates that the second MIC is correct, wherein the fifth authentication message comprises a fourth MIC, and the fourth MIC is generated by the terminal according to the first PTK for protecting the fifth authentication message.

27. The access point according to claim 25, further comprising:
a third sending module, configured to send a first Access Request message to an authentication server (AS), wherein the first Access Request message comprises the user identifier; and
a fourth receiving module, configured to receive a first Access Accept message that is sent by the AS when the AS determines that the user identifier exists.

28. The access point according to claim 25, further comprising:
a fourth sending module, configured to send a DHCP Discovery message;
a fifth receiving module, configured to receive a DHCP Offer message, wherein the DHCP Offer message comprises a server identifier of a DHCP server sending the DHCP Offer message and a second IP address allocated by the DHCP server;
a fifth sending module, configured to send a DHCP Request message; and
a sixth receiving module, configured to receive a DHCP ACK message sent by a selected DHCP server.

29. The access point according to claim 25, further comprising:
a sixth sending module, configured to send a second Access Request message to the AS, wherein the second Access Request message comprises information in the EAP method response message; and
a seventh receiving module, configured to receive a second access accept message that is sent by the AS when the AS successfully authenticates the terminal, wherein the second access accept message comprises authentication success information and the PMK.

30. A terminal, comprising:
a first sending module, configured to send a first authentication message to an access point (AP), wherein the first authentication message comprises a terminal identifier;
a first receiving module, configured to receive a second authentication message that is
sent according to the terminal identifier by the AP, wherein the second authentication message comprises a ANonce of the AP;
a generating module, configured to generate a first pairwise transient key (PTK) according to the ANonce, a SNonce of the terminal, and a preset pre-shared key (PSK);
a second sending module, configured to send a third authentication message to the AP, wherein the third authentication message comprises the SNonce and a first message integrity code (MIC), and the first MIC is generated by the terminal according to the first PTK for protecting the third authentication message;
a second receiving module, configured to receive a fourth authentication message that is sent by the AP when the AP authenticates, according to a second PTK, that the first MIC is correct, wherein the fourth authentication message comprises an association identifier (AID) allocated by the AP for the terminal, a group transient key (GTK), and a second MIC, wherein the second MIC is generated by the AP according to the second PTK for protecting the fourth authentication message, and the second PTK is generated by the AP according to the ANonce, the SNonce, and the PSK; and
an authentication module, configured to authenticate the second MIC according to the first PTK;
wherein the first authentication message further comprises the SNonce, the second authentication message further comprises a third MIC, and the third MIC is generated by the AP according to the second PTK for protecting the second authentication message; and
wherein the sending the third authentication message to the AP comprises sending the third authentication message to the AP when authenticating, according to the first PTK, that the third MIC is correct.

31. An access point (AP), comprising:
a first receiving module, configured to receive a first authentication message sent by a terminal, wherein the first authentication message comprises a terminal identifier;
a first sending module, configured to send a second authentication message to the terminal according to the terminal identifier, wherein the second authentication message comprises a ANonce of the AP;
a second receiving module, configured to receive a third authentication message sent by the terminal, wherein the third authentication message comprises a SNonce of the terminal and a first message integrity code (MIC), the first MIC is generated by the terminal according to a first pairwise transient key (PTK) for protecting the third authentication message, and the first PTK is generated by the terminal according to the ANonce, the SNonce, and a preset pre-shared key (PSK);
a generating module, configured to generate a second PTK according to the ANonce, the SNonce, and the PSK; and
a second sending module, configured to send a fourth authentication message to the terminal when authenticating, according to the second PTK, that the first MIC is correct, wherein the fourth authentication message comprises an association identifier (AID) allocated by the AP for the terminal, a group transient key (GTK), and a second MIC, and the second MIC is generated by the AP according to the second PTK for protecting the fourth authentication message, so that the terminal authenticates the second MIC according to the first PTK;
wherein the first authentication message further comprises the SNonce, the second authentication message further comprises a third MIC, and the third MIC is generated by the AP according to the second PTK for protecting the second authentication message; and
wherein the receiving the third authentication message sent by the terminal comprises receiving the third authentication message sent by the terminal when authenticating, according to the first PTK, that the third MIC is correct.

32. The access point according to claim 31, further comprising:
a third sending module, configured to send a Dynamic Host Configuration Protocol (DHCP) Discovery message;
a third receiving module, configured to receive a DHCP Offer message, wherein the DHCP Offer message comprises a server identifier of a DHCP server sending the DHCP Offer message and a second IP address allocated by the DHCP server;
a fourth sending module, configured to send a DHCP Request message; and
a fourth receiving module, configured to receive a DHCP ACK message sent by a selected DHCP server.

* * * * *